(12) United States Patent
Matsumoto

(10) Patent No.: US 7,415,201 B2
(45) Date of Patent: Aug. 19, 2008

(54) AUTO FOCUSING DEVICE FOR CAMERA AND METHOD USED IN AUTO FOCUSING DEVICE FOR CAMERA FOR DETERMINING WHETHER OR NOT TO EMIT AUXILIARY LIGHT

(75) Inventor: Hisayuki Matsumoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 872 days.

(21) Appl. No.: 10/952,534

(22) Filed: Sep. 28, 2004

(65) Prior Publication Data

US 2005/0104993 A1 May 19, 2005

(30) Foreign Application Priority Data

Sep. 30, 2003 (JP) ............................. 2003-341159

(51) Int. Cl.
*G03B 3/00* (2006.01)
*G03B 13/00* (2006.01)
*G03B 15/02* (2006.01)
*G02B 7/04* (2006.01)
*H04N 5/222* (2006.01)

(52) U.S. Cl. ...................... 396/106; 396/89; 250/201.2; 348/333.01; 348/371; 348/E5.037; 348/E5.045

(58) Field of Classification Search ................ 396/83, 396/89, 96–98, 104, 106, 111, 128, 130, 396/133, 299; 250/201.2; 348/370, 371, 348/333.01, 333.13, 345, E5.037, E5.044, 348/E5.045, E5.047
See application file for complete search history.

(56) References Cited

U.S. PATENT DOCUMENTS

| 4,801,962 A | | 1/1989 | Akashi | |
|---|---|---|---|---|
| 5,892,990 A | * | 4/1999 | Ogi | ............................. 396/89 |
| 6,108,495 A | * | 8/2000 | Takahata et al. | .............. 396/89 |

FOREIGN PATENT DOCUMENTS

| JP | 63-17227 | 7/1988 |
|---|---|---|
| JP | 63-172226 | 7/1988 |
| JP | 2713870 | 10/1997 |
| JP | 2001-013402 | 1/2001 |

OTHER PUBLICATIONS

Chinese Office Action to Chinese Patent Application No. 200410080684.7, dated Nov. 30, 2007 (4 pgs.) with translation (2 pgs.).

* cited by examiner

*Primary Examiner*—Melissa Jan Kova
(74) *Attorney, Agent, or Firm*—Straub and Pokotylo; John C. Pokotylo

(57) ABSTRACT

An auto focusing device for a camera includes a focus detecting section which detects a focused state of an image taking lens an AF mode setting section sets an AF mode of the camera to either a first AF mode or a second AF mode. An auxiliary light emitting section emits an auxiliary light to the object in association with the focus detecting operation by the focus detecting section if the object has a low luminance. An emission control section limits the number of times that the auxiliary light emitting section emits the auxiliary light to the object to one per a predetermined number of operations by the focus detecting section if the AF mode setting section has set the AF mode to the second AF mode.

26 Claims, 13 Drawing Sheets

| Data No. | Distance measuring intervals | Amount of defocus | Integration time | Result for reliability | Target lens position |
|---|---|---|---|---|---|
| 0 | ***** | ***** | ***** | ***** | ***** |
| 1 | ***** | ***** | ***** | ***** | ***** |
| 2 | ***** | ***** | ***** | ***** | ***** |
| 3 | ***** | ***** | ***** | ***** | ***** |
| ... | ............ | ............ | ............ | ............ | ............ |
| 14 | ***** | ***** | ***** | ***** | ***** |

Data No. to be stored
Effective buffer counter

FIG. 7

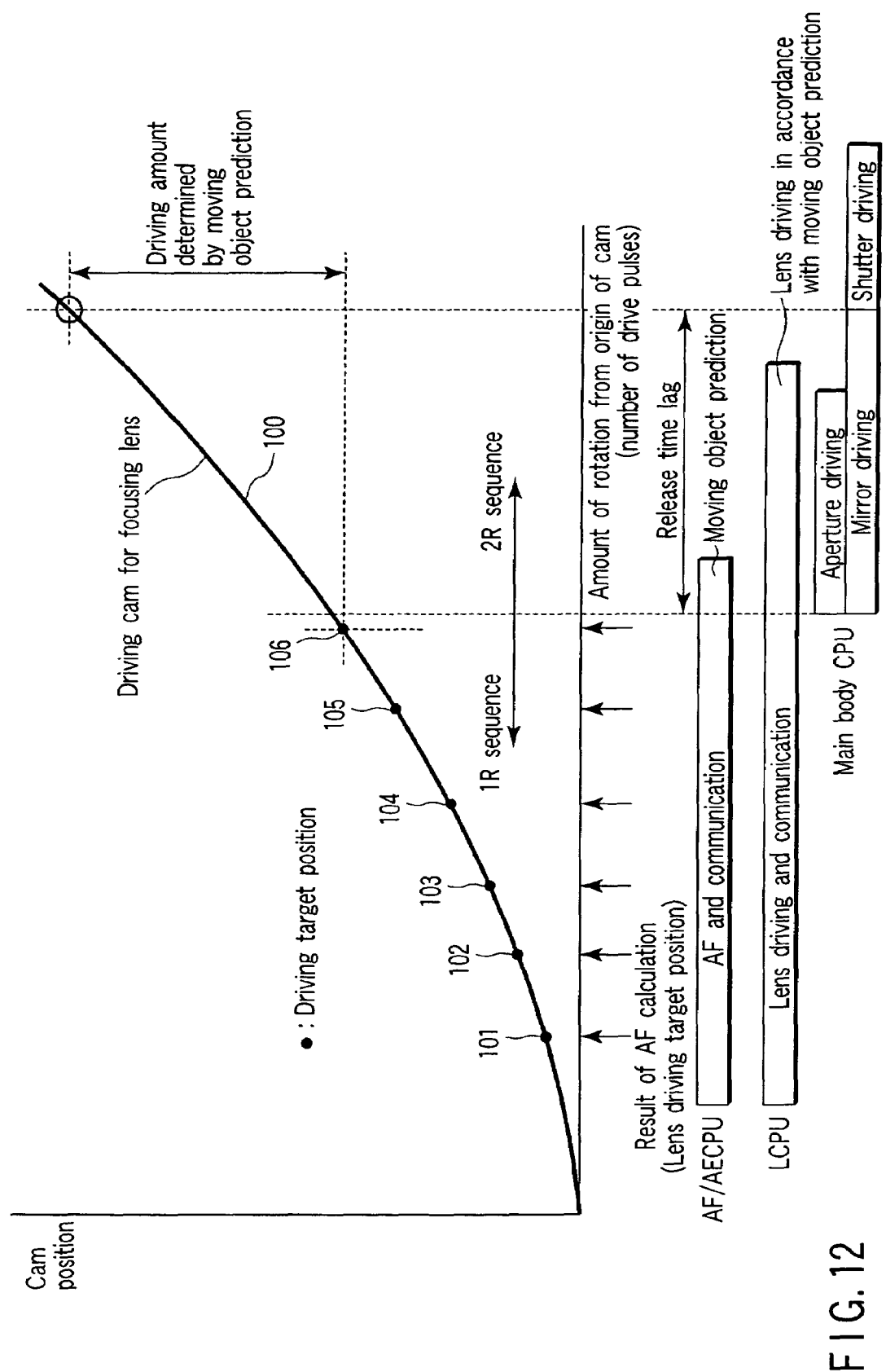
F I G. 12

AUTO FOCUSING DEVICE FOR CAMERA AND METHOD USED IN AUTO FOCUSING DEVICE FOR CAMERA FOR DETERMINING WHETHER OR NOT TO EMIT AUXILIARY LIGHT

CROSS-REFERENCE TO RELATED APPLICATIONS

This application is based upon and claims the benefit of priority from prior Japanese Patent Application No. 2003-341159, filed Sep. 30, 2003, the entire contents of which are incorporated herein by reference.

BACKGROUND OF THE INVENTION

1. Field of the Invention

The present invention relates to an auto focusing device for a camera and a method used in the auto focusing device for the camera for determining whether or not to emit an auxiliary light, and in particular, to an auto focusing device for a camera which detects a focus by emitting an auxiliary light to an object if the focus cannot detected.

2. Description of the Related Art

A large number of techniques are known with which if a focus cannot be detected, an auxiliary light is emitted to an object to detect the focus.

For example, with what is called single auto focusing, once the camera is focused, a focus detecting operation is locked. With this technique, an auxiliary light may be emitted if the results of the last auto focusing indicate that the focus cannot be detected owing to a low luminance. However, with what is called continuous AF which continuously performs a focus detecting operation after focusing or AF used for what is called continuous image taking in which images are continuously taken, when an auxiliary light similar to that used in the single AF is emitted, the light may become too intense depending on conditions for the object. That is, during the continuous AF or continuous image taking, when light emission control is performed which is similar to that used for the signal AF, the auxiliary light may be too glaring or batteries may be significantly consumed.

In view of these circumstances, various proposals have been made for auxiliary light emission control used for the continuous AF or continuous image taking.

For example, Jpn. Pat. Appln. KOKAI Publication No. 63-172226 proposes a technique to prohibit emission of an auxiliary light in a continuous image taking mode. Further, Jpn. Pat. Appln. KOKAI Publication No. 63-172227 proposes a technique to switch an AF mode to a single AF mode when an auxiliary light is emitted in a continuous AF mode. Moreover, Japanese Patent No. 2713870 proposes a technique with which once the camera is focused in the continuous AF mode, emission of an auxiliary light is prohibited during subsequent AF operations.

BRIEF SUMMARY OF THE INVENTION

According to a first aspect of the present invention, there is provided an auto focusing device for a camera comprising:
an image taking lens;
a focus detecting section which detects a focused state of the image taking lens;
an AF mode setting section which sets an AF mode of the camera to either a first AF mode in which upon detecting the focused state of the image taking lens, the focus detecting section is prohibited from subsequently performing a focus detecting operation, or a second AF mode in which even after detecting the focused state of the image taking lens, the focus detecting section continuously performs a focus detecting operation;
an auxiliary light emitting section which emits an auxiliary light to the object in association with the focus detecting operation by the focus detecting section, if the object has a low luminance; and
an emission control section which limits the number of times that the auxiliary light emitting section emits the auxiliary light to the object to one per a predetermined number of operations by the focus detecting section, if the AF mode setting section has set the AF mode to the second AF mode.

According to a second aspect of the present invention, there is provided an auto focusing device for a camera comprising:
an image taking lens;
a focus detecting section which detects a focused state of the image taking lens;
an image taking mode setting section which sets an image taking mode of the camera to a continuous image taking mode in which images are continuously taken;
an auxiliary light emitting section which emits an auxiliary light to the object in association with the focus detecting operation by the focus detecting section if the object has a low luminance; and
an emission control section which limits the number of times that the auxiliary light emitting section emits the auxiliary light to the object to one per a predetermined number of operations by the focus detecting section, if the image taking mode setting section has set the image taking mode to the continuous image taking mode.

According to a third aspect of the present invention, there is provided an auto focusing device for a camera comprising:
an image taking lens;
a focus detecting section which detects a focused state of the image taking lens;
an AF mode setting section which sets an AF mode of the camera to either a first AF mode in which upon detecting the focused state of the image taking lens, the focus detecting section is prohibited from subsequently performing a focus detecting operation, or a second AF mode in which even after detecting the focused state of the image taking lens, the focus detecting section continuously performs a focus detecting operation;
an auxiliary light emitting section which emits an auxiliary light to the object in association with the focus detecting operation by the focus detecting section, if the object has a low luminance;
an object change determining section which determines whether or not a state of the object has changed; and
an emission control section which performs control so that the auxiliary light emitting section emits the auxiliary light to the object, if the AF mode setting section has set the AF mode to the second AF mode and if the object change determining section determines that the state of the object has changed.

According to a fourth aspect of the present invention, there is provided an auto focusing device for a camera comprising:
an image taking lens;
a focus detecting section which detects a focused state of the image taking lens;
an image taking mode setting section which sets an image taking mode of the camera to a continuous image taking mode in which images are continuously taken;
an auxiliary light emitting section which emits an auxiliary light to the object in association with the focus detecting operation by the focus detecting section, if the object has a low luminance;

an object change determining section which determines whether or not a state of the object has changed; and an emission control section which performs control so that the auxiliary light emitting section emits the auxiliary light to the object, if the image taking mode setting section has set the image taking mode to the continuous image taking mode and if the object change determining section determines that the state of the object has changed.

Additional objects and advantages of the invention will be set forth in the description which follows, and in part will be obvious from the description, or may be learned by practice of the invention. The objects and advantages of the invention may be realized and obtained by means of the instrumetalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a conceptual drawing illustrating a storage format used to store data required for moving object predictive calculations;

FIG. 12 is a graph illustrating the concept of moving object predictions;

FIG. 14 is a flow chart of an AF sequence executed after a first release switch has been turned on.

DETAILED DESCRIPTION OF THE INVENTION

An embodiment of the present invention will be described below with reference to the drawings.

Figure 1:
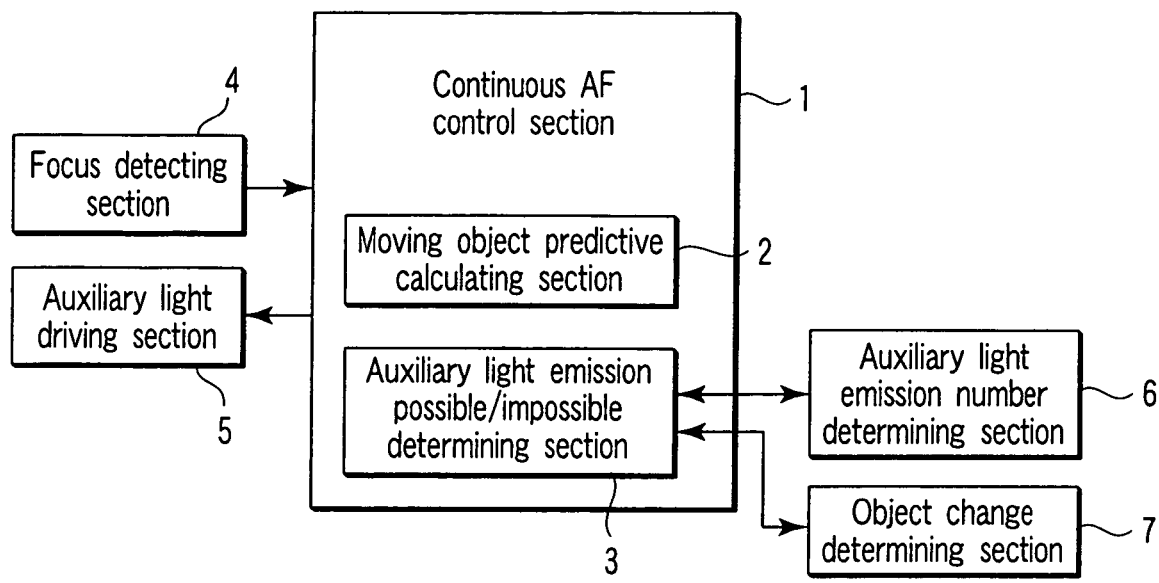
FIG. 1 is a block diagram illustrating a main part of the configuration of an auto focusing device for a camera according to an embodiment of the present invention.

FIG. 1 is a block diagram illustrating a main part of the configuration of an auto focusing device for a camera according to an embodiment of the present invention.

An auto focusing device for a camera in FIG. 1 has a continuous AF control section 1 that performs general control during continuous AF. Specifically, the continuous AF control section 1 performs continuous AF control including lens control associated with the continuous AF. Further, the continuous AF control section 1 contains a moving object predictive calculating section 2 and an auxiliary light emission possible/impossible determining section 3. The moving object predictive calculating section 2 executes calculations associated with moving object predictions, described later. The auxiliary light emission possible/impossible determining section 3 determines whether or not to emit an auxiliary light to an object during the continuous AF.

Further, the continuous AF control section 1 connects to a focus detecting section 4, an auxiliary light driving section 5, an auxiliary light emission number determining section 6, and an object change determining section 7.

The focus detecting section 4 executes focus detection calculations on the basis of the result of detection by an AF sensor (described later). Focusing control is performed on the basis of the result of a focus detection calculation executed by the focus detecting section 4. The result of the focus detection calculation executed by the focus detecting section 4 is also inputted to the moving object predictive calculating section 2.

The auxiliary light driving section 5 emits an auxiliary light to the object if the auxiliary light emission possible/impossible determining section 3 determines that an auxiliary light be emitted. The auxiliary light emission number determining section 6 counts the number of times the auxiliary light driving section 5 has or has not emitted an auxiliary light. The count is inputted to the auxiliary light emission possible/impossible determining section 3.

The object change determining section 7 determines during AF whether or not the state of the object (object image) has changed. The result of the determination is inputted to the auxiliary light emission possible/impossible determining section 3.

That is, the auxiliary light emission possible/impossible determining section 3 determines whether or not to emit an auxiliary light on the basis of the result inputted by the auxiliary light emission number determining section 6 or object change determining section 7.

Figure 2:
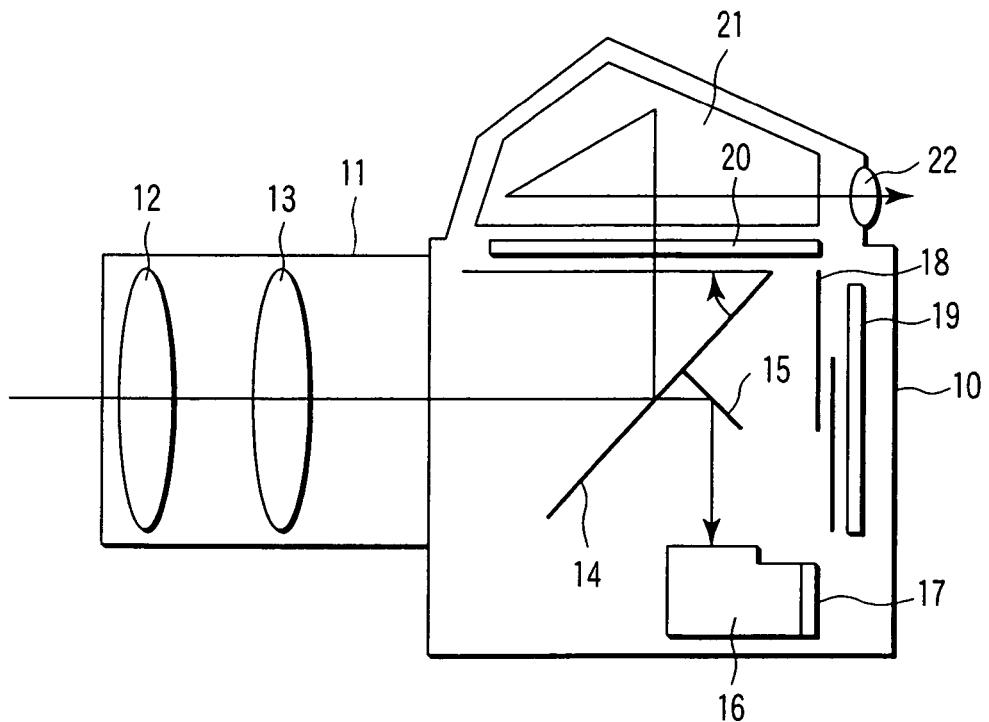
FIG. 2 is a side sectional view of a single-lens reflex camera in which the auto focusing device for the camera according to the embodiment of the present invention is mounted.

Now, a detailed description will be given of the camera in which the auto focusing device in FIG. 1 is mounted. FIG. 2 is a side sectional view of a single-lens reflex camera described as an example of the camera in which the auto focusing device is mounted. This camera is composed of a camera main body 10 and an exchange lens section 11 that can be installed in and removed from the camera main body 10. In this case, the camera is assumed to be a digital still camera. However, the technique according to the present embodiment is applicable to cameras other than the digital still cameras.

The exchange lens section 11 is composed of a focusing lens 12 and a zoom lens 13 which operate as an image taking lens. The focusing lens 12 is driven in the direction of its optical axis to adjust the focal state of the exchange lens section 11. The zoom lens 13 is driven in the direction of its optical axis to change the focal distance of the exchange lens section 11.

The camera main body 10 is composed of a main mirror 14, a submirror 15, a focus detecting optical system 16, a focus detecting sensor (hereinafter referred to as an AF sensor) 17, a focal plane shutter 18, an image pickup device 19, a screen mat 20, a finder optical system 21, and an ocular 22.

The main mirror 14 is composed of a half mirror to allow part of a luminous flux from the object to pass through, while reflecting part of the luminous flux. Further, the main mirror 14 is configured to be rotatively movable in a direction shown by an arrow in the figure so that during exposure, all the luminous flux incident via the exchange lens section 11 travels to an image pickup surface composed of the image pickup device 19.

During operations other than the exposure, the part of the luminous flux from the object which has passed through the main mirror 14 is reflected by the submirror 15 to travel to the focus detecting optical system 16. The focus detecting optical system 16 is composed of a lens required to detect the focus. The focus detecting optical system 16 guides the luminous flux reflected by the submirror 15, to the AF sensor 17. A detailed description will be given later of the configuration of the focus detecting optical system 16. Further, the AF sensor 17 is composed of, for example, a photo diode array. The AF sensor 17 is configured to be capable of multiple focus detections. In other words, the AF sensor 17 has multiple photo diode arrays corresponding to respective focus detection areas. A detailed description will be given later of the configuration of the AF sensor 17.

As previously described, during exposure, the main mirror 14 withdraws from the optical axis of the exchange lens section 11. Consequently, the luminous flux from the object is incident toward the image pickup surface. At this time, the focal plane shutter 18 is drivingly controlled so as to apply an appropriate quantity of light to the image pickup surface. Specifically, when the focal plane shutter 18 is opened, the luminous flux from the object is incident on the image pickup surface, composed of the image pickup device 19. The image pickup device 19, constituting the image pickup surface, is, for example, a CCD if the auto focusing device is mounted in a digital still camera. If a silver halide camera is used, a silver halide film is used in place of the image pickup device 19.

During operations other than the exposure, the part of the luminous flux from the object which is reflected by the main mirror 14 is incident toward a finder. The luminous flux is then formed into an image on the screen mat 20. This image is incident on the ocular 22 via the finder optical system 21. A photographer can determine an image taking range, the focal state of the object, and the like by looking through the ocular 22.

Figure 3:
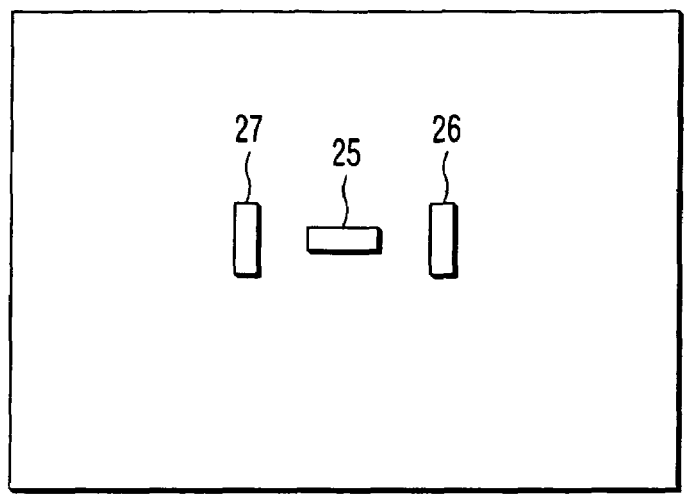
FIG. 3 is a schematic diagram of focus detection areas displayed in a finder.

FIG. 3 is a schematic diagram of the focus detection areas displayed in the finder. The example shown in FIG. 3 indicates multi-AF using distance measuring areas for three points. When the photographer looks through the ocular 22, the finder displays focus detection area marks corresponding to multiple focus detection areas of the AF sensor 17, that is, a central distance measuring area mark 25, a right distance measuring area mark 26, and a left distance measuring area mark 27.

Figure 4:
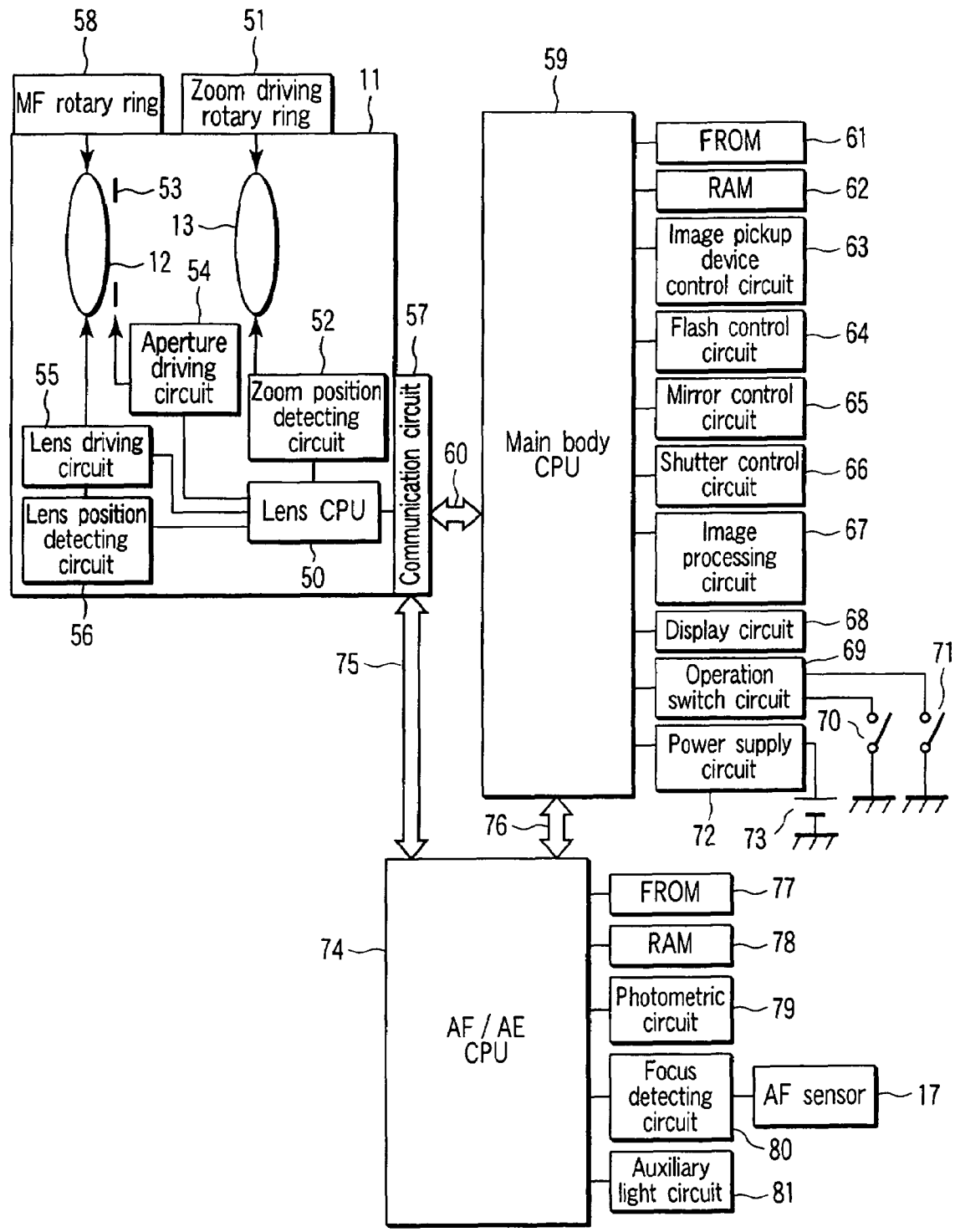
FIG. 4 is a block diagram illustrating the electrical configuration of the camera according to the embodiment of the present invention.

The electrical configuration of the camera will be described with reference to FIG. 4.

First, the configuration of the exchange lens section 11 will be described. A zoom driving rotary ring 51 and a manual focusing (MF) rotary ring 58 are disposed outside the exchange lens section 11 so as to surround it in ring form. The photographer can change the focal distance of the exchange lens section 11 by rotating the zoom driving rotary ring 51 around the optical axis of the exchange lens section 11 to drive the zoom lens 13 in the direction of the optical axis.

On the other hand, when the MF rotary ring 58 is rotated around the optical axis of the exchange lens section 11, the focusing lens 12 is driven in the direction of the optical axis in unison with the rotation. This enables the focus of the exchange lens section 11 to be manually adjusted. In this case, the MF rotary ring 58 is used when the photographer operates a switch (not shown) for switching between an auto focusing mode and a manual focusing mode, to select the manual focusing mode.

The exchange lens section 11 is provided with the focusing lens 12, the zoom lens 13, a aperture 53, and an lens CPU (hereinafter referred to as an LCPU) 50. The LCPU 50 performs various control operations (for example, lens driving control, aperture driving control, and communication control) for the exchange lens section 11. The LCPU 50 connects to a zoom position detecting circuit 52, a aperture driving circuit 54, a lens driving circuit 55, a lens position detecting circuit 56, and a communication circuit 57.

The zoom position detecting circuit 52 detects the position of the zoom lens 13 driven by the zoom driving rotary ring 51. The LCPU 50 can obtain information on the focal distance of the exchange lens section 11 on the basis of the position of the zoom lens 13 detected by the zoom position detecting circuit 52.

The aperture 53 is composed of an opening or the like used to adjust the quantity of light incident toward the camera main body 10. The LCPU 50 allows an appropriate quantity of light to travel toward the camera main body 10 by controlling the aperture driving circuit 54 to vary the size of the opening in the aperture 53.

Further, in the auto focusing mode, the LCPU 50 controls the lens driving circuit 55 to drive the focusing lens 12. The lens position detecting circuit 56 detects the position of the focusing lens 12 driven by the lens driving circuit 55. In this case, the lens position detecting circuit 56 is composed of, for example, a photo interrupter (PI) circuit. The photo interrupter circuit detects the rotation number of a motor for driving the lens driving circuit 55 by converting the rotation number into the number of pulses. In other words, the lens position detecting circuit 56 detects an absolute position with respect to the focusing lens 12 as the number of pulses with respect to a certain reference position. The LCPU 50 can calculate information on the focal state of the exchange lens section 11 on the basis of the lens position detected by the lens position detecting circuit 56.

Further, the LCPU 50 communicates information such as the amount of driving of the aperture and the amount of defocus in the exchange lens section 11, to a CPU or an AF/AECPU in the camera main body via the communication circuit 57. Thus, a communication terminal for the communication circuit 57 is disposed outside the exchange lens section 11.

Now, the configuration of the camera main body 10 will be described. The camera main body 10 has a main body CPU 59 that controls the whole camera. The main body CPU 59 connects to a communication line 60, a flash ROM (FROM) 61, a RAM 62, an image pickup device control circuit 63, a flash control circuit 64, a mirror control circuit 65, a shutter control circuit 66, an image processing circuit 67, a display circuit 68, an operation switch circuit 69, a power supply circuit 72, and an AF/AECPU 74.

The communication circuit 60 is a communication line used to communicate via the LCPU 50 and the communication circuit 57. The FROM 61 is a memory in which programs for the main body CPU 59 and the like are stored. The RAM 62 is a memory that temporarily stores various pieces of information stores various piece of information processed by the main body CPU 59. The image pickup device control circuit 63 controls the image pickup device 19 in order to obtain image data. The flash control circuit 64 irradiates the object (not shown) with a flash light. The mirror control circuit 65 performs control so that the main mirror 14 can move up and down. The shutter control circuit 66 controls the focal plane shutter 18. The image processing circuit 67 processes image data via the image pickup device control circuit 63. The display circuit 68 displays images taken and various image taking information on a display section. The operation switch circuit 69 connects to various operation switches operated by the photographer.

The operation switch circuit 69 is provided with, for example, a release switch operated using a release button. A release switch according to the embodiment is a common two-stage switch. Specifically, the release button is half-pushed to turn on a first release switch 70 (hereinafter referred to as a "1R switch"). Focus detection and a photometric operation are performed, and the focusing lens 12 is driven to bring the camera into a focused state. Moreover, the release button is fully pushed to turn on a second release switch 71 (hereinafter referred to as a "2R switch"). The main mirror 14 and the focal plane shutter 18 are driven to carry out exposure.

The operation switch circuit 69 is also provided with an image taking mode switch in order to switch the image taking mode of the camera to the continuous image taking mode, and an AF mode switch in order to set the AF mode of the camera to a single AF mode as a first AF mode or a continuous AF mode as a second AF mode.

The power supply circuit 72 supplies power to the camera to smooth or boost the voltage of batteries 73 installed in the camera.

The AF/AECPU 74, operating as the continuous AF control section 1, controls auto focusing (AF) and auto exposure (AE). The AF/AECPU 74 connects to a communication line 75, a communication line 76, a flash ROM (FROM) 77, a RAM 78, a photometric circuit 79, a focus detecting circuit 80, and an auxiliary light circuit 81.

The communication line 75 is used to allow the AF/AECPU 74 and the LCPU 50 to communicate with each other via the communication circuit 57 of the exchange lens section 11. The communication line 76 is used to allow the AF/AECPU 74 and the main body CPU 59 to communicate with each other. The FROM 77 is a memory in which programs for the AF/AECPU 74 and the like are stored. The RAM 78 is a memory in which various pieces of information processed by the AF/AECPU 74 and the like are temporarily stored.

The photometric circuit 79 controls a photometric device (not shown) that measures the luminance of the object, to obtain information on the luminance of the object. Further, the focus detecting circuit 80, operating as the focus detecting section 4, executes a focus detection calculation on the basis of information obtained by controlling the AF sensor 17, to obtain information on focus detection. Moreover, the auxiliary light circuit 81, operating as the auxiliary light driving section 5, uses a light emitting device such as a light emitting diode (LED) to emit an auxiliary light to the object if the object has such a low luminance that the focus detecting circuit 80 cannot detect the focus.

Now, with reference to FIG. 5, a detailed description will be given of the configuration of the focus detecting optical system 16 and the AF sensor 17.

Figure 5:
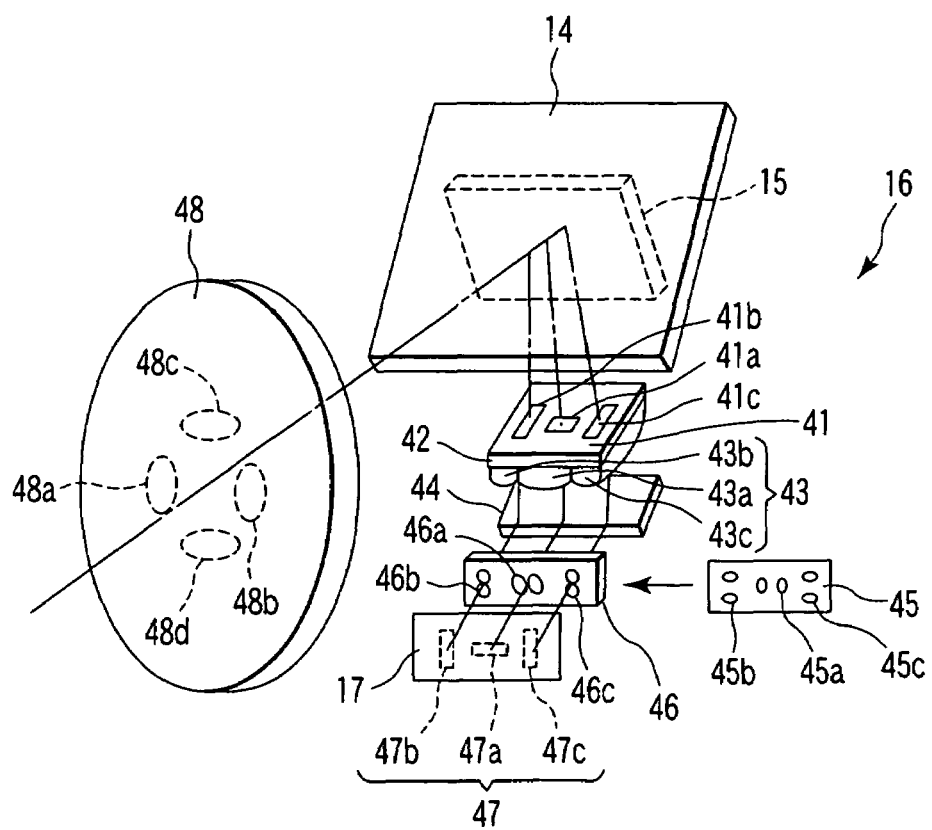
FIG. 5 is an exploded perspective view useful in describing the configuration of a focus detecting optical system and an AF sensor in detail.

In FIG. 5, a visual field mask 41 constricts a luminous flux obtained via the submirror 15. The visual field mask 41 has three openings 41a, 41b, and 41c to allow the transmission of luminous fluxes (shown by alternate long and short dash lines) for three focus detection areas which beams are guided by the submirror 15.

An infrared cut filter 42 cuts an infrared light component that may affect focus detection. A condenser lens 42 condenses light passing through the infrared cut filter 42. The condenser lens 43 is composed of three condenser lenses 43a, 43b, and 43c arranged in association with the respective openings 41a, 41b, and 41c.

A total reflection mirror 44 reflects luminous fluxes incident via the condenser lenses, toward a separator aperture mask 45. The separator aperture mask 45 constricts the incident luminous fluxes. The separator aperture mask 45 has three openings 45a, 45b, and 45c formed in association with the respective focus detection areas to divide each of the luminous fluxes for the three focus detection areas, obtained via the condenser lenses 43a, 43b, and 43c.

A separator lens 46 re-forms the luminous fluxes obtained via the separator aperture mask 45, into an image. The separator lens 46 is composed of three separator lenses 46a, 46b, and 46c provided in association with the three focus detection areas.

The previously described AF sensor 17 includes a photo diode array 47 that is a photoelectric converting device array used to obtain a light intensity signal corresponding to the light intensity distribution of received luminous fluxes. The photo diode array 47 is composed of three photo diode arrays 47a, 47b, and 47c provided in association with the luminous fluxes for the three focus detection areas. That is, the two luminous fluxes into which the corresponding initial luminous flux is divided by the corresponding one of the separator lenses 46a, 46b, and 46c are incident on the corresponding one of the photo diode arrays 47a, 47b, and 47c. The luminous fluxes are then formed into an image. The photo diode array 47a is placed to extend in a direction corresponding to a horizontal direction of an image taking screen. The two other photo diode arrays 47b and 47c are arranged in a direction corresponding to a vertical direction of the image taking screen at positions not containing the optical axis.

An image taking lens 48 shown in FIG. 5 is a virtual lens corresponding to a group of lenses in the exchange lens section 11, for example, a combination of the previously described focusing lens 12 and the zoom lens 13.

In the focus detecting optical system 16, configured as shown in FIG. 5, the photo diode arrays 47a, 47b, and 47c receive focus detection luminous fluxes passing through different areas 48a, 48b, 48c, and 48d in an emission pupil surface of the image taking lens 48. The luminous fluxes are thus converted into electric signals (light intensity signals) indicating the light intensity distribution pattern of the image. The light intensity signals are used to execute an AF calculation using a TTL phase difference system, which is utilized for focus detection.

In this case, with the single-lens reflex camera in which the auto focusing device for the camera according to the present embodiment is mounted, the AF mode switch (not shown), provided in the operation switch circuit 69, can be used to switch the AF mode between the single AF mode and the continuous AF mode. In the single AF mode, once the focused state is detected, no subsequent focus detecting operations are performed, that is, a focus lock operation is performed. On the other hand, in the continuous AF mode, focus detection and lens driving are continuously carried out. In other words, in the continuous AF mode, what is called a moving object predictive calculation is executed in order to focus the camera on a moving object.

Figure 6:
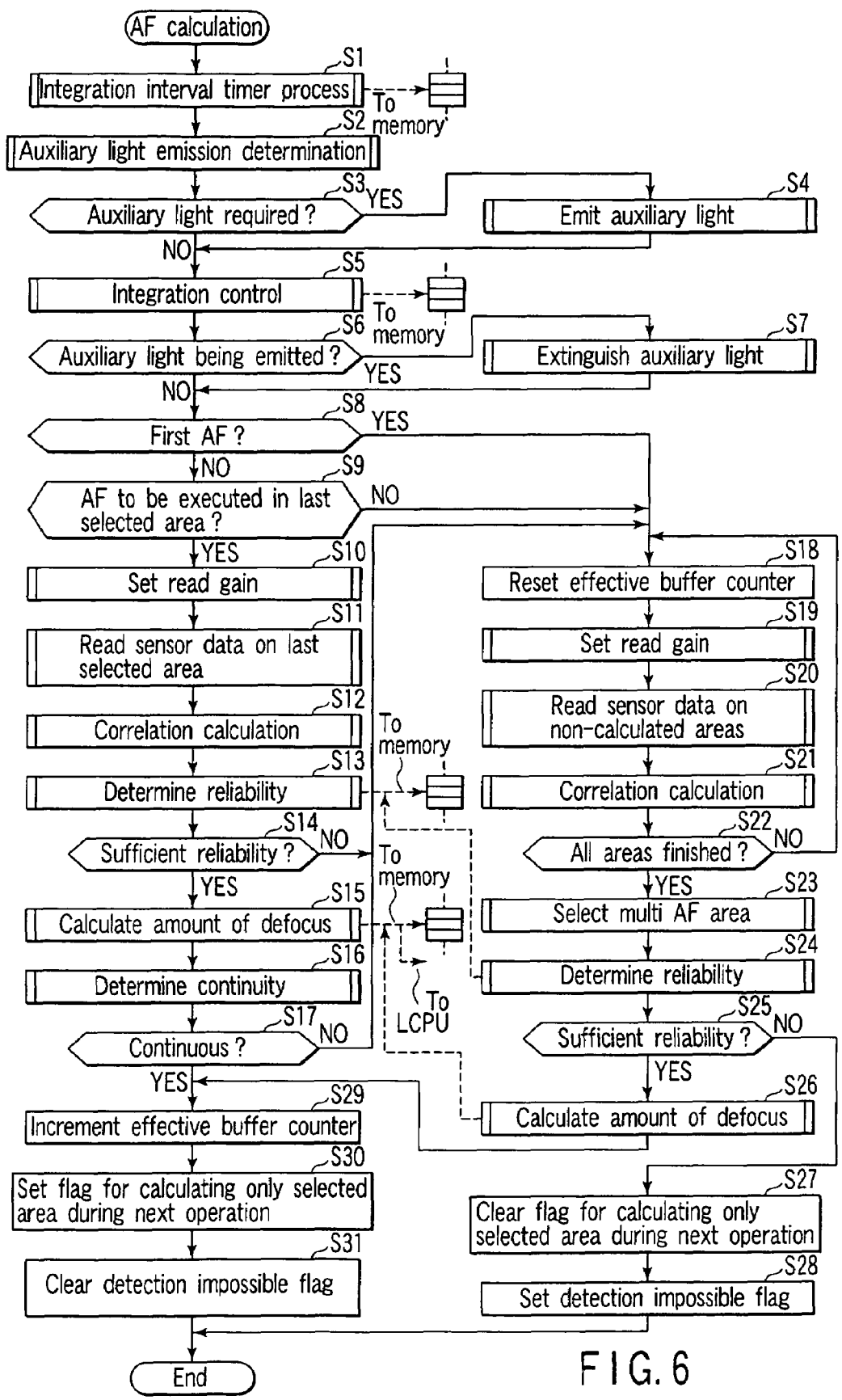
FIG. 6 is a flow chart of an AF calculating process executed during continuous AF or a continuous image taking mode.

FIG. 6 is a flow chart of an AF calculation executed when the 1R switch is turned on in the continuous AF mode. The procedure of controlling the calculation as shown in the flow chart in FIG. 6 is also applied to the case where the image taking mode of the camera is set to the continuous image taking mode. An AF calculation executed in a single image taking mode or a single AF mode is similar to the one executed according to well-known techniques. Accordingly, its description is omitted.

In FIG. 6, the AF/AECPU 74 executes an integration interval timer process to start the operation of a timer (not shown) that measures time intervals for integrations (step S1). At this time, the AF/AECPU 74 also loads a timer value measured when the operation is started during the last AF. The AF/AECPU 74 stores the loaded timer value in a predetermined memory, in this case, the RAM 78. That is, this timer value corresponds to the time interval (hereinafter referred to as an AF interval) between the last AF and the current AF. In this case, it should be appreciated that the timer value stored in the RAM 78 has an initial value of 0.

Then, the AF/AECPU 74 executes an auxiliary light emission determining process to determine whether or not an auxiliary light must be emitted to the object during the current integration (step S2). The auxiliary light emission determining process will be described later in detail. After the process in the step S2, the AF/AECPU 74 determines whether or not an auxiliary light must be emitted (step S3). The determination in the step S3 is executed by determining whether or not an auxiliary light request flag described later has been set. If the AF/AECPU 74 determines in the step S3 that an auxiliary light must be emitted, it allows an auxiliary light to be emitted via the auxiliary light circuit 81 (step S4). Subsequently, the AF/AECPU 74 shifts to a step S5. On the other hand, if the AF/AECPU 74 determines in the step S3 that the auxiliary light need not be emitted, it shifts from the step S3 to the step S5.

Then, the AF/AECPU 74 allows the AF sensor 17 to perform an integrating operation (step S5). The AF/AECPU 74 also measures and stores an integration time in the RAM 78. Then, the AF/AECPU 74 determines whether or not an auxiliary light is now being emitted (step S6). If the AF/AECPU 74 determines that an auxiliary light is being emitted, the light is extinguished (step S7).

Then, the AF/AECPU 74 determines whether or not the current AF is the first (step S8). If the AF/AECPU 74 determines that the current AF is not the first, it then determines whether or not to execute an AF calculation on the same focus detection area as that selected during the last AF (step S9). The determination in the step S9 is executed by determining whether or not a predetermined flag described later was set during the last AF calculation. If the predetermined flag has been set, the AF calculation is executed on the same focus detection area as that selected during the last AF.

In this case, the AF/AECPU 74 sets a gain used in reading sensor data detected by the AF sensor 17 (step S10). Then, the AF/AECPU 74 reads sensor data on the focus detection area selected during the last AF (step S11). The AF/AECPU 74 then stores the sensor data in the RAM 78.

The AF/AECPU 74 then allows the focus detecting circuit 80 to execute a correlation calculation to calculate the amount of correlations between two images formed on each of the photo diode arrays 47a, 47b, and 47c, constituting the AF sensor 17 (step S12). Then, the AF/AECPU 74 determines the reliability of the sensor data, detected by the AF sensor 17, on the basis of the result of the correlation calculation in the step S12 (step S13). The AF/AECPU 74 then stores data of the determined reliability in the RAM 78. Subsequently, the AF/AECPU 74 determines whether or not sensor data is reliable, that is, whether or not AF is possible, on the basis of the result of the determination of the reliability (step S14).

If the AF/AECPU 74 determines in the step S14 that the sensor data is reliable, it then allows the focus detecting circuit 80 to calculate the amount of defocus (step S15). The AF/AECPU 74 then stores the calculated amount of defocus in the RAM 78. In this case, the amount of defocus is calculated on the basis of the interval between the two images formed on the photo diode array. Then, the AF/AECPU 74 determines the continuity between the amount of defocus calculated in the step S15 and the amount of defocus calculated during the last AF (step S16). The determination of the continuity in the step S16 will be described later in detail. Subsequently, the AF/AECPU 74 determines whether or not these amounts of defocus are continuous, on the basis of the result of the determination of the continuity in the step S16 (step S17). If the AF/AECPU 74 determines in the step S17 that these amounts of defocus are continuous, it shifts from the step S17 to a step S29.

Further, if the AF/AECPU 74 determines in the step S8 that the current AF is the first, if the AF/AECPU 74 determines in the step S9 that no AF calculation is executed on the same focus detection area as that selected during the last AF, if the AF/AECPU 74 determines in the step S14 that the sensor data is not reliable, or if the AF/AECPU 74 determines in the step S17 that the amounts of defocus are not continuous, then it shifts to a step S18 to execute multi-AF. In this case, the AF/AECPU 74 resets a value in an effective buffer counter that resets the various data stored in the RAM 78 (step S18). This prevents previous data from being used for a moving object predictive calculation described later.

Then, the AF/AECPU 74 sets the gain used in reading the sensor data (step S19). The AF/AECPU 74 then reads the sensor data on a focus detection area not selected during the last AF (step S20). The AF/AECPU 74 then stores the sensor data in the RAM 78.

Subsequently, the AF/AECPU 74 allows the focus detecting circuit 80 to execute a correlation calculation (step S21). The AF/AECPU 74 then determines whether or not calculations have been finished for all the focus detection areas (step S22). The AF/AECPU 74 repeats the operations from the step S18 to the step S22 until the calculations have been finished for all the focus detection areas.

On the other hand, if the AF/AECPU 74 determines in the step S22 that the calculations have been finished for all the focus detection areas, it selects one of all the focus detection areas for focus detection (step S23). Here, for example, an area in which the object is located at the shortest distance is selected from all the focus detection areas. Then, the AF/AECPU 74 determines the reliability of the area selected in the step S23 (step S24). The AF/AECPU 74 then stores data on the determined reliability in the RAM 78. Subsequently, the AF/AECPU 74 determines whether or not the sensor data is reliable, that is, whether or not AF is possible, on the basis of the result of the determination of the reliability (step S25).

If the AF/AECPU 74 determines in the step S25 that the sensor data is reliable, it then allows the focus detecting circuit 80 to calculate the amount of defocus (step S26). The AF/AECPU 74 then shifts to a step S29. If the AF/AECPU 74 determines in the step S25 that the sensor data is not reliable, it then clears the predetermined flag so as to execute multi-AF during the next AF (step S27). The AF/AECPU 74 further sets a detection impossible flag indicating that the focus cannot be detected in none of the focus detection areas (step S28). The AF/AECPU 74 then finishes the AF calculation control shown in the flow chart.

Further, if the amount of defocus can be calculated, the AF/AECPU 74 increments the effective buffer counter by one (step S29). The AF/AECPU 74 sets the above predetermined flag (step S30). This enables the sensor data on the currently selected focus detection area to be utilized during the next AF calculation. Then, the AF/AECPU 74 clears the detection impossible flag (step S31) to finish the AF calculation control shown in the flow chart.

FIG. 7 is a conceptual drawing illustrating a storage format used to store data required for moving object predictive calculations; the data is stored in the RAM 78 in the steps S1, S5, S15, S13, and S24 in FIG. 6. In the present embodiment, various data are stored in the RAM 78 in a ring buffer format. In this format, after a predetermined number of data have been stored, they are overwritten starting with the oldest data. In this case, the numerical value counted by the effective buffer counter described for the steps S18 and S29 in FIG. 6 corresponds to the next address information to be written to a ring buffer. For example, in the step S18 in FIG. 6, if the focus cannot be detected in a focus detection area where the last focus detection is successful or the last and current amounts of defocus are not continuous, then the value in the effective buffer counter is cleared. Then, new data is stored during the next operation.

Now, with reference to FIG. 8, description will be given of the auxiliary light emission determining process executed in the step S2 in FIG. 6. With the single-lens reflex camera in which the auto focusing device for the camera according to the present embodiment is mounted, in the continuous image taking mode or the continuous mode, an auxiliary light is emitted to the object once per a predetermined number of AF operations. This increases the possibility of focusing if, for example, the state of the object changes after the camera has been focused at a low luminance. Further, if it is determined that a camera angle or the state of the object has changed, an auxiliary light is allowed to be emitted to the object to increase the possibility of focusing at a low luminance after the camera has been focused. The auxiliary light is not emitted for every operation taking the consumption of the batteries and the glaringness into account.

Figure 8:
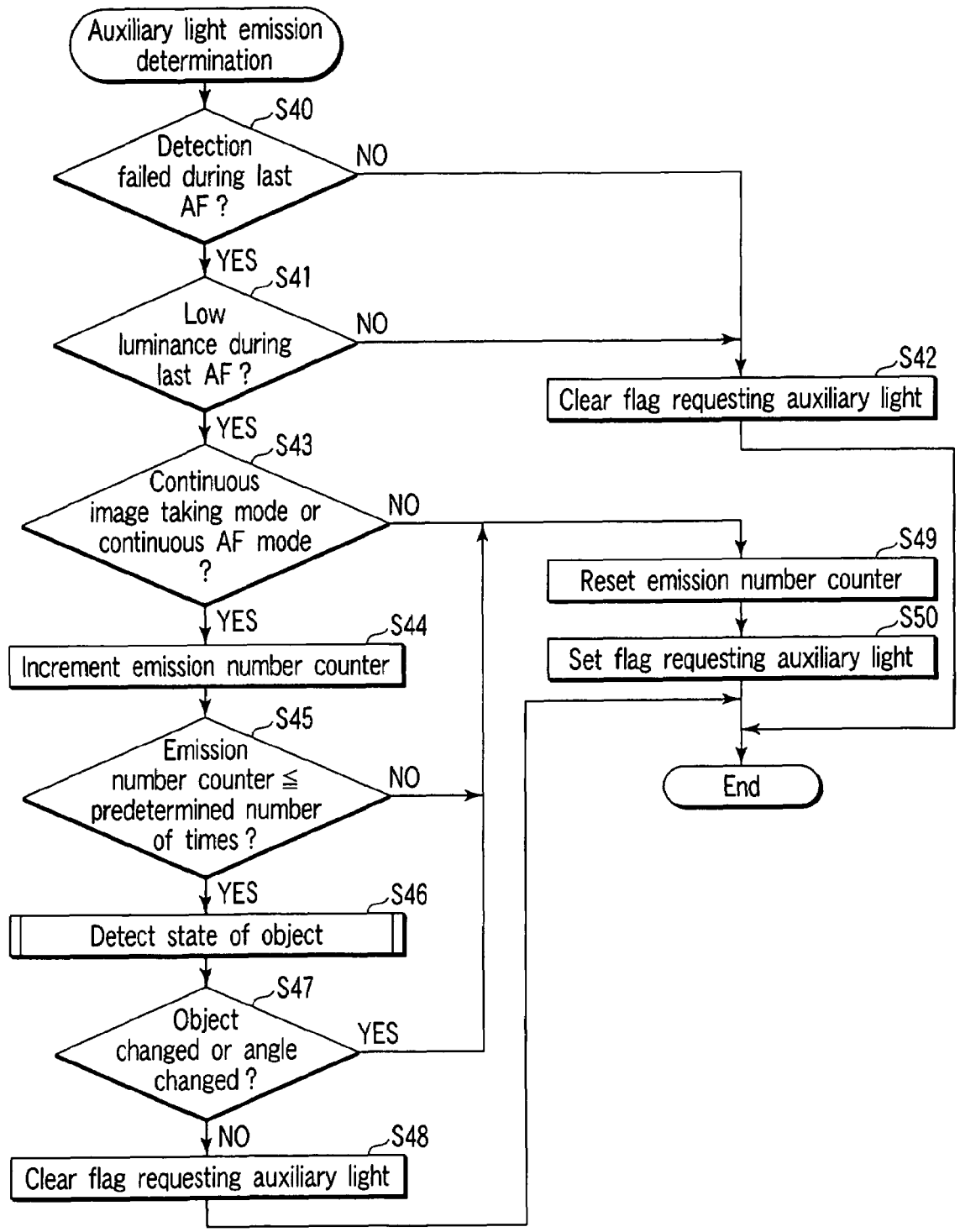
FIG. 8 is a flow chart illustrating a process of determining whether or not to emit an auxiliary light.

In the auxiliary light emission determining process shown in FIG. 8, the AF/AECPU 74 determines whether or not the focus detection during the last AF has failed (step S40). If the AF/AECPU 74 determines in the step S40 that the focus detection during the last AF has failed, it determines whether or not the luminance of the object during the last AF is low (step S41). In this case, whether or not the focus detection during the last AF has failed is determined on the basis of the data on the reliability stored in the RAM 78. Further, whether the luminance of the object during the last AF is low is determined on the basis of the integration time data stored in, for example, the RAM 78. Then, the luminance is determined to be low when the integration time is longer than a predetermined time. Whether or not the luminance is low may also be determined on the basis of the result of a photometric operation performed by the photometric circuit 79.

If the AF/AECPU 74 determines in the step S40 that the focus detection during the last AF has been successful or if the AF/AECPU 74 determines in the step S41 that the luminance of the object during the last AF is not low, it clears the auxiliary light request flag (step S42) to finish the auxiliary light emission determining control shown in the flow chart.

On the other hand, if the AF/AECPU 74 determines in the step S41 that the luminance of the object during the last AF is low, it then determines whether or not the current image taking mode is the continuous image taking mode or the current AF mode is the continuous AF mode (step S43). The AF calculation shown in FIG. 6 is an example of the continuous image taking mode or continuous AF mode. Accordingly, in this case, the AF/AECPU 74 always determines that the camera is in the continuous image taking mode or the continuous AF mode. However, the auxiliary light emission determination is also executed in the case of the single image taking mode or single AF mode. Consequently, the procedure includes a determination executed in a step S43, shown in FIG. 8.

In the step S43, if the AF/AECPU 74 determines that the camera is in the continuous image taking mode or the continuous AF mode, it increments an emission number counter operating as the auxiliary light emission number determining section 6, by one (step S44). The emission number counter counts the number of consecutive AF operations without an auxiliary light. In other words, when an auxiliary light is emitted, the value in the emission number counter is reset.

Then, the AF/AECPU 74 determines whether or not the number counted by the emission number counter has at most a predetermined number (step S45). In this case, the predetermined number in the step S45 is stored in, for example, the FROM 61. Increasing the predetermined number in the step S45 reduces the accuracy of focusing. Reducing the predetermined number increases the consumption of the batteries and the glaringness. Thus, the predetermined number in the step S45 is desirably set at a value (about five) determined taking the above conditions into account in a well-balanced manner.

In the step S45, if the AF/AECPU 74 determines that the number counted by the emission number counter has at most the predetermined value, it detects a change in the state of the object (step S46). Changes in the state of the object include, for example, a change in the object itself caused by an increase or decrease in the camera angle and defocusing resulting from movement of the object.

Various methods can be used to detect a change in the state of the object in the step S46. For example, a change in camera angle can be detected by using a vibration detecting circuit composed of, for example, an angular speed sensor used for an vibration insulating technique for cameras or the like. Alternatively, the state of the object may be detected on the basis of a change in the distribution of the luminance of the object outputted by the photometric circuit 79 or image processing circuit 67, or the type of the object may be detected using a well-known image recognition technique employing the image processing circuit 67.

The AF/AECPU 74 determines whether or not there has been a change in the state of the object such as a change in the object itself or a change in the camera angle, on the basis of the result of the detection in the step S46 (step S47). If the AF/AECPU 74 determines in the step S47 that the state of the object has not changed, it clears the auxiliary light request flag (step S48) to finish the auxiliary light emission determination control shown in the flow chart.

Further, if AF/AECPU 74 determines in the step S43 that the current image taking mode is not the continuous image taking mode and that the current AF mode is not the continuous AF mode, if the AF/AECPU 74 determines in the step S45 that the number of times counted by the emission number counter is larger than a predetermined number, or if the AF/AECPU 74 determines in the step S47 that the state of the object has change, it then resets the value in the emission number counter (step S49). Subsequently, the AF/AECPU 74 sets the auxiliary light request flag (step S50) to finish the auxiliary light emission determination control shown in the flow chart.

That is, in the present embodiment, the number of emissions of an auxiliary light is restricted so as to avoid consecutively emitting the auxiliary light a predetermined number of times. Also in this case, if the state of the object changes, making it necessary to emit the auxiliary light, then the auxiliary light is emitted during the next AF. This increases the possibility of focusing at a low luminance while reducing the consumption of the batteries and the glaringness.

FIG. 8 shows both an example in which the number of emissions of an auxiliary light (the number of non-emissions) is counted so that the auxiliary light is emitted once per a predetermined number of operations and an example in which the auxiliary light is emitted if the state of the camera or object has changed. However, of course, it is allowable to perform only one of these control operations.

Figure 9:
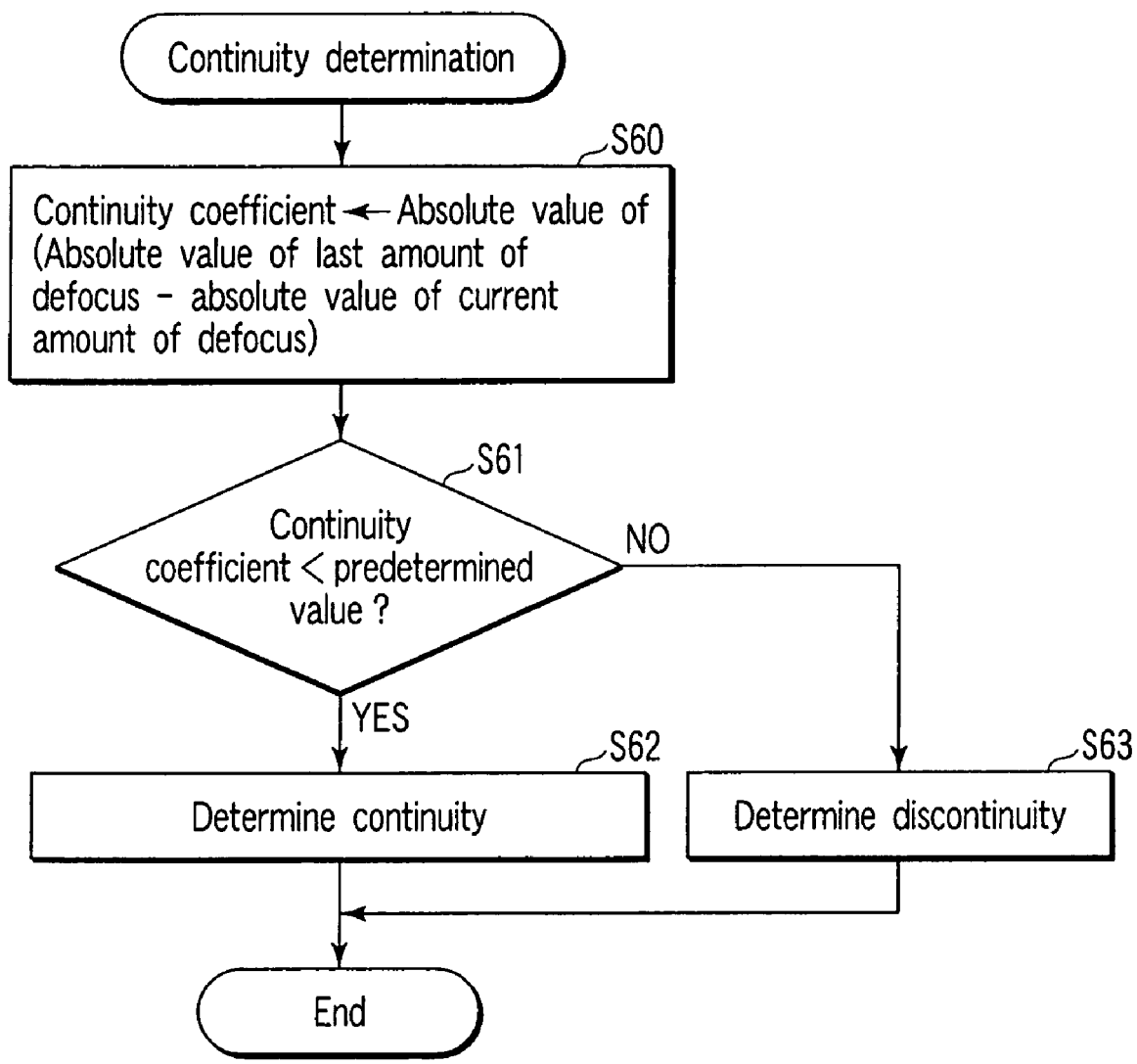
FIG. 9 is a flow chart illustrating a process of determining continuity.

Now, with reference to the flow chart in FIG. 9, description will be given of the process of determining the continuity in the step S16 in FIG. 6.

In the continuity determining process, first, the absolute value of the difference between the absolute value of the last amount of defocus and the absolute value of the current amount of defocus is calculated (step S60). In this case, the absolute value of this difference is defined as a continuity coefficient. Then, it is determined whether or not the continuity coefficient is smaller than a predetermined value (step S61). If it is determined in the step S61 that the continuity coefficient is smaller than the predetermined value, that is, if the difference between the last amount of defocus and the current amount of defocus is somewhat small, then it is determined that the amounts are continuous. Then, a predetermined flag is set which indicates the continuity (step S62). On the other hand, if it is determined in the step S61 that the continuity coefficient is at least the predetermined value, that is, if the difference between the last amount of defocus and the current amount of defocus is not small, then it is determined that the amounts are discontinuous. Then, a predetermined flag is set which indicates the discontinuity (step S63). After these operations, the continuity determining process is finished.

Figure 10:
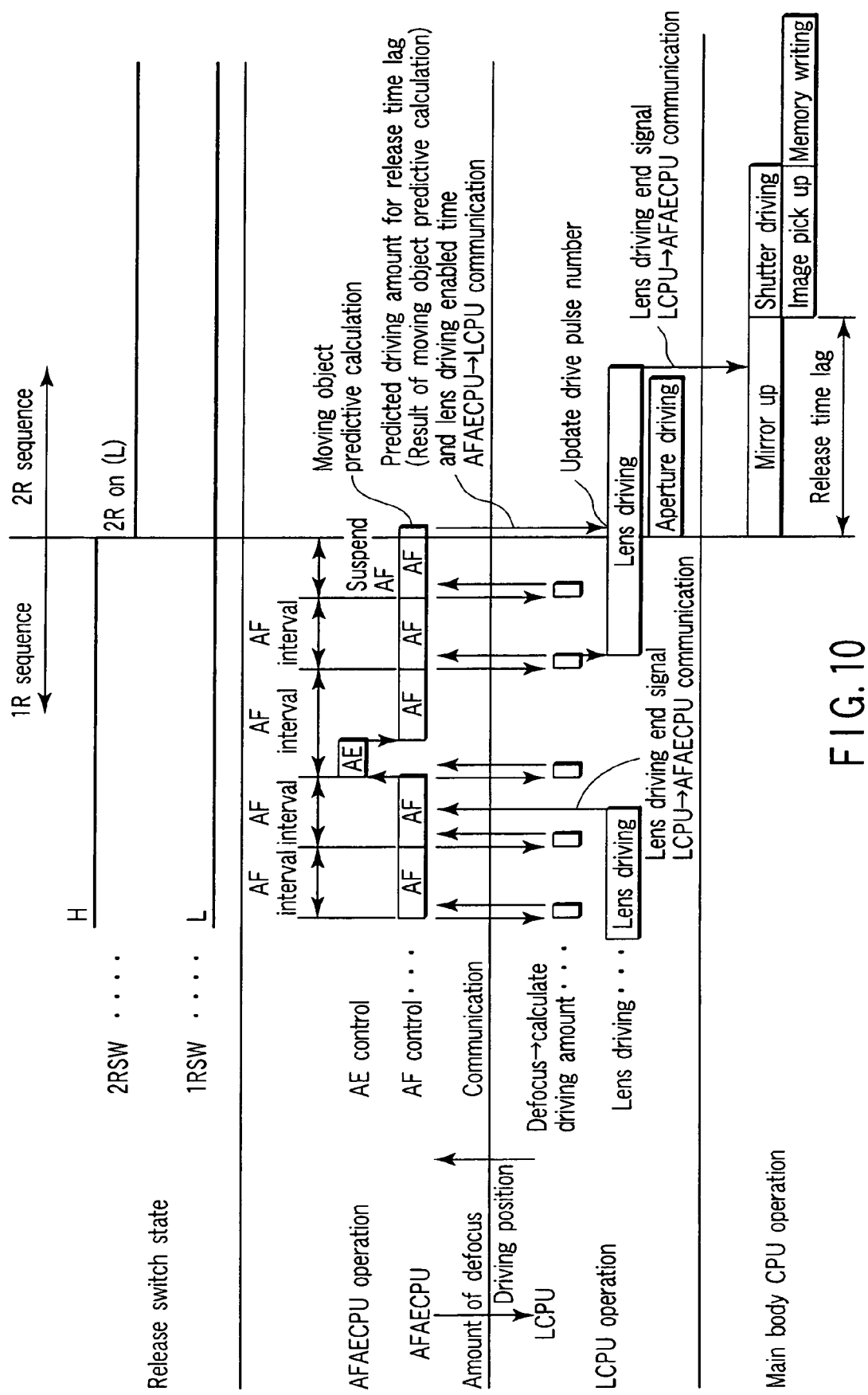
FIG. 10 is a timing chart illustrating control performed during the continuous AF.

FIG. 10 is a timing chart illustrating the state during the continuous AF and before and after the 2R switch 71 is turned on.

First, description will be given of a sequence (hereinafter referred to as a 1R sequence) executed when the 1R switch 70 is on while the 2R switch 71 is off. First, the LCPU 50 calculates the amount by which the lens is driven, on the basis of the amount of defocus transmitted as a result of the first AF calculation. In this case, the lens driving amount corresponds to the number of drive pulses for the lens driving circuit 55. Subsequently, the lens driving circuit 55 starts driving the focusing lens 12 on the basis of the calculated number of drive pulses.

After transmitting the defocus amount data to the LCPU 50 as a result of the AF calculation, the AF/AECPU 74 immediately executes the next AF calculation. In other words, the AF/AECPU 74 executes the AF calculation in parallel with the lens driving. Then, every time the AF/AECPU 74 finishes the AF calculation, it transmits the calculated defocus amount data to the LCPU 50.

The LCPU 50 calculates the lens driving amount on the basis of the defocus amount data transmitted by the AF/AECPU 74, while allowing the lens driving circuit 55 to drive the lens. The LCPU 50 then calculates a drive target position from the calculated lens driving amount. The LCPU 50 then returns the data to the AF/AECPU 74. Subsequently, these operations are repeated. Here, the drive target position will be described later in detail.

Once the first lens driving is finished, the LCPU 50 transmits a lens driving end signal to the AF/AECPU 74. Upon receiving the lens driving end signal, the AF/AECPU 74 allows the photometric circuit 79 to perform a photometric operation after the current AF calculation has been finished.

As described above, when the 1R switch 70 is on, while the 2R switch 71 is off, the AF, AE, and lens driving are repeated. On this occasion, as described in FIG. 6, the AF/AECPU 74 stores, in the ring buffer (RAM 78), data used for a moving object predictive calculation, such as the AF interval data and defocus amount data.

Now, description will be given of a sequence (hereinafter referred to as a 2R sequence) executed when the 2R switch 71 is on. In this case, the 2R switch 71 is turned on by the photographer at an arbitrary time. That is, the 2R switch is turned on at an arbitrary time within 1R sequence. Now, description will be given of the case where the 2R switch is turned on while the AF/AECPU 74 is executing an AF calculation and while the LCPU 50 is driving the lens.

Since the 2R switch 71 is turned on, the camera shifts to an exposure operation. Specifically, while the LCPU 50 continues the last lens driving, the AF/AECPU 74 suspends the current AF calculation in order to reduce a time lag and executes a moving object predictive calculation. The moving object predictive calculation will be described later.

Then, the AF/AECPU 74 executes the moving object predictive calculation to predict the amount by which the object may move during a release time lag (the time after the 2R switch 71 has been turned on and before an exposure operation is performed). Then, the AF/AECPU 74 calculates the lens driving amount from the predicted amount. Moreover, the AF/AECPU 74 determines the final target position of the focusing lens 12 from the predicted amount of driving. The AF/AECPU 74 then transmits information of the final driving position to the LCPU 50. Subsequently, the AF/AECPU 74 also transmits the time for which the lens can be driven to the LCPU 50. In this case, the lens can be driven only during a release time lag shown in FIG. 10. In other words, if the lens is driven for a time equal to or longer than the release time lag, the subsequent shutter driving is delayed. As a result, the release time lag is increased. Consequently, data on the time for which the lens can be driven must also be transmitted to the LCPU 50. The LCPU 50 forces the lens driving to be stopped if the driving is not finished after the elapse of the lens driving possible time.

Further, the LCPU 50 drives the lens to the received drive target position. That is, the current lens driving is continuously executed with the last lens driving amount, so that the lens is continuously driven to the updated target position.

Moreover, the LCPU 50 simultaneously receives, from the AF/AECPU 74, the predicted amount of driving and the amount by which the aperture 53 is driven. The aperture driving amount is calculated by the photometric circuit 79 on the basis of the results of the latest photometric operation.

Furthermore, the LCPU 50 controls the aperture driving circuit 54 on the basis of the received amount of aperture driving to allow the aperture 53 to be driven. While the lens is being driven, the aperture is also driven.

On the other hand, the main body CPU 59 controls the mirror control circuit 65 to drive the main mirror 14 to an up position. Specifically, while the LCPU 50 is driving the lens and the aperture, the main body CPU 59 also drives the mirror. The three circuits are thus controlled in parallel in order to reduce the time lag.

Once the three circuits have been completely controlled, the main body CPU 59 allows the focal plane shutter 18 to be driven via the shutter control circuit 66. At this time, the image pickup device 19 picks up an image. In this case, the time for which the focal plane shutter 18 remains open is equal to the time calculated by the photometric circuit 79.

Finally, the main body CPU 59 controls the image pickup device 19 via the image pickup element control circuit 63 to obtain image data. The main body CPU 59 then stores the image data thus obtained in the RAM 62.

Figure 11:
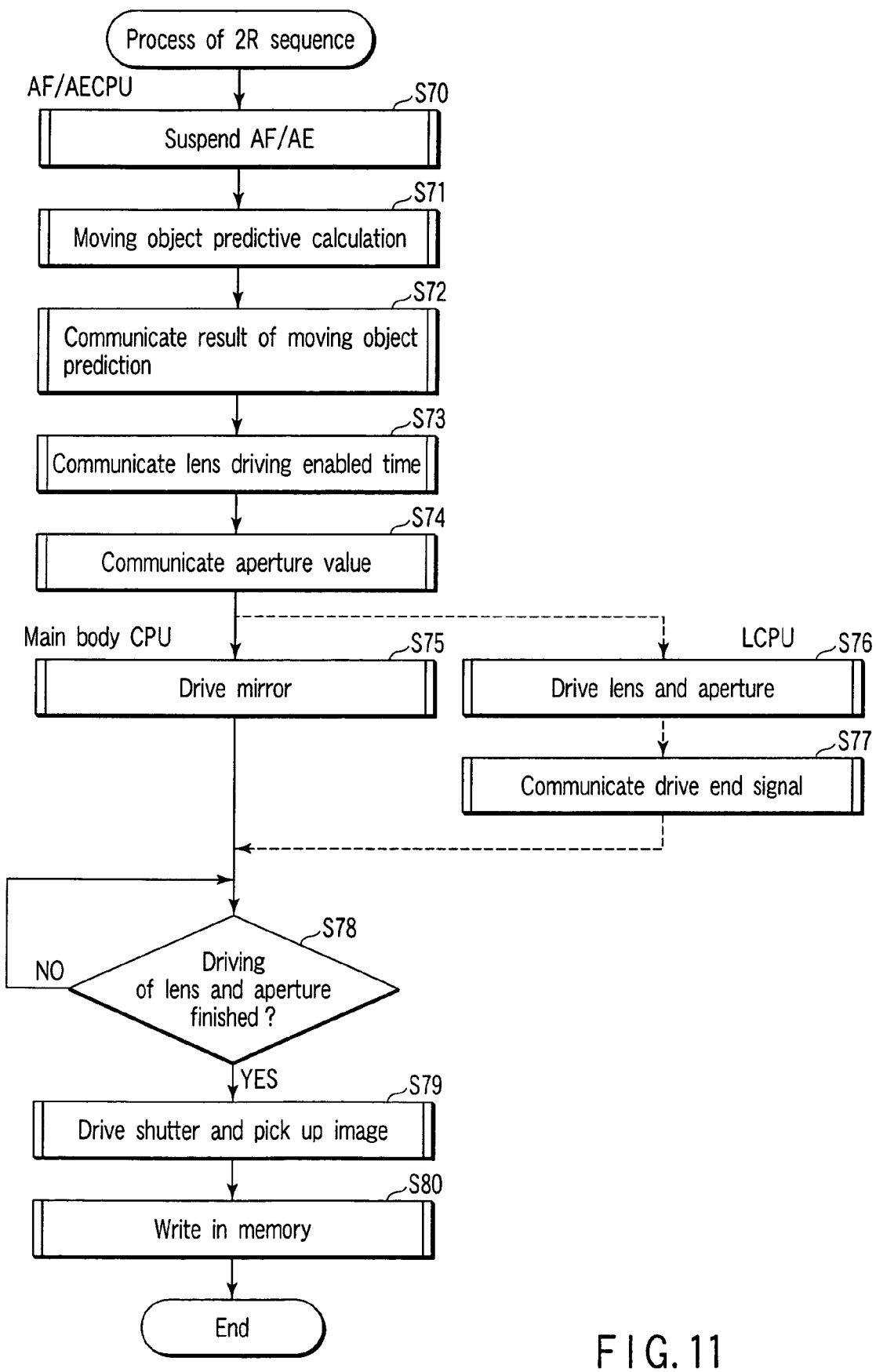
FIG. 11 is a flow chart illustrating a procedure of controlling a second release sequence.

FIG. 11 is a flow chart of the 2R sequence, described in FIG. 10. In this case, the 2R sequence continues from the 1R sequence, so that the lens is continuously driven.

Since the 2R switch 71 is turned on, the AF/AECPU 74 suspends the current AF calculation (or AE calculation) in order to reduce the time lag (step S70). Then, the AF/AECPU 74 executes a moving object predictive calculation to predict the amount by which the object may move during the release time lag (step S71). The moving object predictive calculation will be described later. Then, the AF/AECPU 74 then transmits the result of the prediction to the LCPU 50 (step S72). Moreover, the AF/AECPU 74 transmits the time for which the lens can be driven, to the LCPU 50 (step S73). In this case, since the release lag time is almost equal to a mirror up time, the lens driving possible time is used as the mirror up time. The LCPU 50 forces the lens driving to be ended when the lens driving possible time has elapsed. This prevents the release time lag from being increased as result of an excessively long time required for the lens driving. Subsequently, the AF/AECPU 74 also transmits the amount by which the aperture 53 is driven, to the LCPU 50 (step S74). In this case, the aperture driving amount is calculated by the photometric circuit 79 on the basis of the results of the latest photometric operation.

Then, the main body CPU 59 uses the mirror control circuit 65 to drive the main mirror 14 to an up position (step S75). Then, the LCPU 50 controls the aperture driving circuit 54 on the basis of the received aperture driving amount to drive the aperture 53 (step S76). Also in this case, the LCPU 50 is driving the lens. That is, the lens driving continuing from the 1R sequence is executed until the focusing lens 12 reaches the final target position corrected in the step S71. Then, when the aperture driving and the lens driving are finished, the LCPU 50 notifies the main body CPU 59 of this by transmitting a drive end signal to the main CPU 59 (step S77). Moreover, the main body CPU 59 determines whether or not the drive end signal has been received (step S78). If the main body CPU 59 determines in the step S78 that the drive end signal has not been received, it waits for the signal to be received. On the other hand, if the main body CPU 59 determines in the step S78 that the drive end signal has been received, it controls the shutter control circuit 66 to drive the focal plane shutter 18. This allows the image pickup device 19 to pick up an image. In this case, the time for which the focal plane shutter 18 remains open is equal to the time calculated by the photometric circuit 79. Then, the main body CPU 59 uses the image pickup element control circuit 63 to control the image pickup device 19 to obtain image data (step S79). The main body CPU 59 then stores the image data thus obtained in the RAM 62 (step S80). Subsequently, the main body CPU 59 records the image data stored in the RAM 62, in a recording medium such as a memory card.

Now, the concept of a moving object prediction will be described with reference to FIG. 12. The focusing lens 12 is configured so that the lens driving circuit 55 rotates a driving cam (not shown) to move the lens on the optical axis. Reference numeral 100 denotes a curve showing the position of the driving cam in the direction of the optical axis with respect to the rotation number of the cam. An axis of abscissa indicates not only the rotation number of the driving cam but also the number of pulses measured by a photo interrupter (not shown) of the lens position detecting circuit 56 using a certain reference position. An axis of ordinate indicates the amount by which the driving cam is drifted when the cam is rotated from the certain reference position.

As already described, the AF/AECPU 74 transmits the amount of defocus detected during the 1R sequence, to the LCPU 50, and the LCPU 50 calculates and returns the number of pulses to the AF/AECPU 74. In this case, the position of the focusing lens 12 on the driving cam at the start of integration plus the calculated number of pulses corresponds to the focused position of the object (hereinafter referred to as a drive target position; the drive target position is denoted by reference numerals 101 to 106) at the start of integration. The LCPU 50 transmits the drive target position to the AF/AECPU 74. The AF/AECPU 74 stores data on the drive target position in the ring buffer shown in FIG. 7 (the RAM 78). In this case, data on AF intervals and the reliability of each AF operation is also stored in the ring buffer.

When the 2R switch 71 is turned on, the AF/AECPU 74 executes a moving object predictive calculation to predict the drive target position taken after the release time lag. Subsequently, a 2R sequence such as the one already described is executed, and the shutter is then driven.

Figure 13:
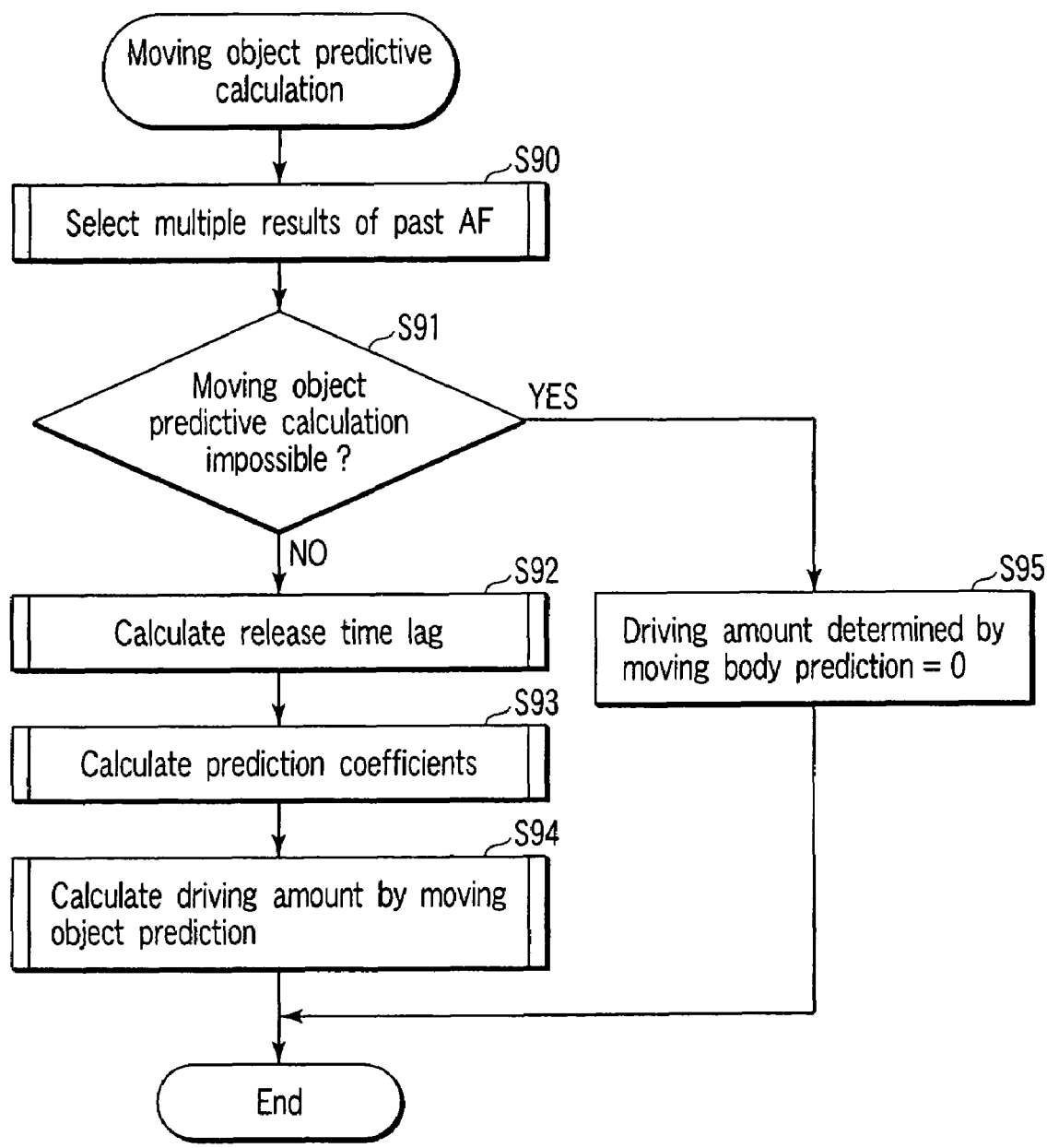
FIG. 13 is a flow chart illustrating a process procedure of moving object predictive calculations.

FIG. 13 is a flow chart of the moving object predictive calculation in the step S71 in FIG. 11. In the moving object predictive calculation, first, the AF/AECPU 74 selects several (at least three) of the multiple results of past distance measuring operations (that is, the drive target positions 101 to 106) (step S90). As the basis of the selection of results of distance measuring operations, top priority is given to the result of the latest distance measuring operation. Moreover, reliable data is employed on the basis of the reliability data stored in the RAM 78. Then, the AF/AECPU 74 determines whether or not a moving object predictive calculation can be executed, on the basis of the results selected in the step S90 (step S91). This determination depends on whether or not all the required data is obtained in the step S90.

If the AF/AECPU 74 determines in the step S91 that a moving object predictive calculation is possible, it calculates the release time lag (step S92). In this case, the mirror up time corresponds to the release time lag. If the mirror up time does not vary significantly, the release time lag may have a fixed value.

After calculating the release time lag, the AF/AECPU 74 calculates coefficients of an equation of prediction (step S93). There are various equations of prediction. For example, there is a quadratic of prediction as shown by the curve in FIG. 12. Since the coefficients of this quadratic vary depending on the release time lag and the AF intervals, they are calculated for each operation.

Subsequently, as described in FIG. 12, the lens driving target position taken after the release time lag is predicted (step S94) to finish the moving object predictive calculation control shown in the flow chart.

On the other hand, if the AF/AECPU 74 determines in the step S91 that a moving object predictive calculation is impossible, it sets the amount by which the moving object is predicted to be driven, to zero (step S95), to finish the moving object predictive calculation control shown in the flow chart. In other words, if the moving object prediction is impossible, it is not executed, and the lens is driven only to the focused position detected in the final AF.

Figure 14:
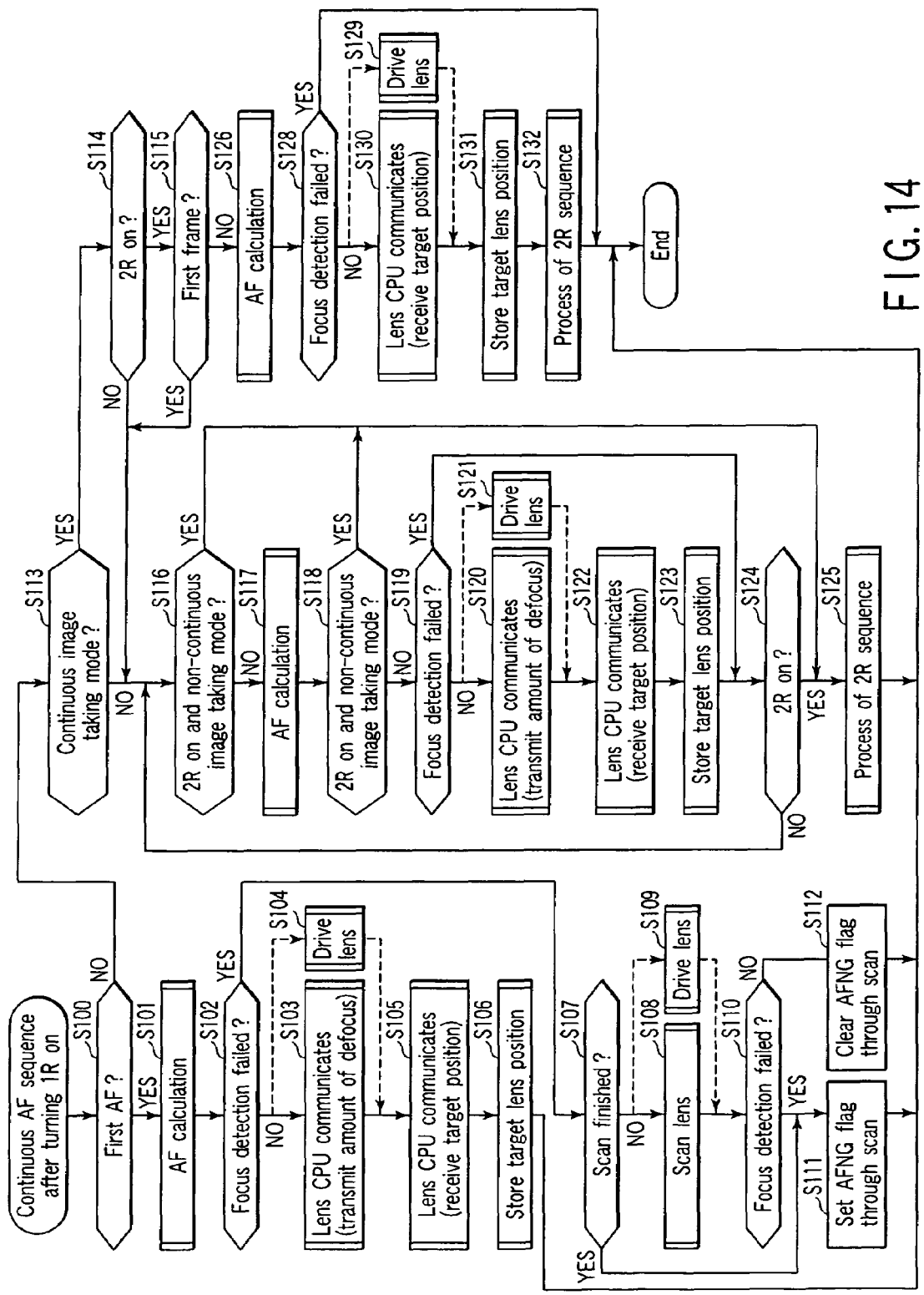

Now, with reference to FIG. 14, description will be given of the control of the whole AF sequence in the continuous AF mode or continuous image taking mode which is control is performed after the 1R switch 70 has been turned on. First, the AF/AECPU 74 determines whether or not the current AF is the first since the 1R switch 70 was turned on (step S100).

If the AF/AECPU 74 determines in the step S100 that the current AF is the first, it executes the AF calculation described in FIG. 6 (step S101). Then, the AF/AECPU 74 determines whether or not the focus could not be detected, on the basis of the state of the detection impossible flag set in the step S101 (step S102). Upon determining in the step S102 that the focus was successfully detected, the AF/AECPU 74 transmits data on the amount of defocus calculated as a result of the AF calculation in the step S101, to the LCPU 50 (step S103). The AF/AECPU 74 then shifts to a step S105.

The LCPU 50 calculates the number of drive pulses that drive the lens, on the basis of the received defocus amount data. The LCPU 50 drives the focusing lens 12 to the focused position on the basis of the number of drive pulses (step S104). The LCPU 50 also calculates the lens position where the object is in focus, on the basis of the lens driving amount. The LCPU 50 then transmits the lens position to the AF/AECPU 74 as the drive target position data. The AF/AECPU 74 receives the drive target position data (step S105). Then, the AF/AECPU 74 stores the received drive target position data in the ring buffer shown in FIG. 7 (step S106). The AF/AECPU 74 then finishes the AF sequence shown in the flow chart.

On the other hand, upon determining in the step S102 that the focus could not be detected, the AF/AECPU 74 then determines whether or not a lens scan operation has been performed (step S107). The lens scan operation comprises executing AF while driving the lens, in order to detect the lens position where the focus can be detected, if the focus cannot be detected. If the AF/AECPU 74 determines in the step S107 that a lens scan has been executed, it shifts from the step S107 to a step S111.

On the other hand, the AF/AECPU 74 determines in the step S107 that no lens scan has been executed, it executes AF as a lens scan operation (step S108). On the other hand, the LCPU 50 drives the lens (step S109). This allows the detection of a lens position where the focus can be detected.

Subsequently, the AF/AECPU 74 determines again whether or not the focus could not be detected, on the basis of the result of the lens scan (step S110). Upon determining that the focus could not be detected, the AF/AECPU 74 sets an AFNG flag indicating that the focus detection based on the lens scan has failed (step Sill). The AF/AECPU 74 thus finishes the AF sequence shown in the flow chart. On the other hand, upon determining in the step S110 that the focus was successfully detected, the AF/AECPU 74 clears the AFNG flag (step S112) to finish the AF sequence shown in the flow chart. In this case, the focusing lens 12 can be focused during the next AF.

Further, if the AF/AECPU 74 determines in the step S100 that the current AF is the second or later, it determines whether or not the current image taking mode is set to the continuous image taking mode (step S113). If the AF/AECPU 74 determines in the step S113 that the current image taking mode is set to the continuous image taking mode, it determines whether or not the 2R switch 71 has been turned on (step S114). If the AF/AECPU 74 determines in the step S114 that the 2R switch 71 has been turned on, it determines whether or not the first frame in the continuous image taking is being imaged (step S115).

If the AF/AECPU 74 determines in the step S113 that the camera is not in the continuous image taking mode, if the AF/AECPU 74 determines in the step S114 that the 2R switch 71 has not been turned on, or if the AF/AECPU 74 determines in the step S115 that the first frame in the continuous image taking is being imaged, then it shifts to a step S116. The AF/AECPU 74 determines whether or not the 2R switch was turned on while the camera was not in the continuous image taking mode (step S116). When the AF/AECPU 74 determines in the step S116 that the 2R switch was turned on while the camera was not in the continuous image taking mode, both the 1R switch 70 and the 2R switch 71 were turned on at a time. In this case, the AF/AECPU 74 immediately shifts to a step S125 to execute the process of the 2R sequence. In this case, the AF calculation was executed in the step S101, so that it need not be executed again.

On the other hand, if the AF/AECPU 74 determines in the step S118 that the image taking mode is set to the continuous image taking mode or that 2R switch has not been turned on, it executes the AF calculation, described in FIG. 6. Subsequently, the AF/AECPU 74 determines again whether or not the 2R switch was turned on while the camera was not in the continuous image taking mode (step S118). Upon determining that the 2R switch was turned on while the camera was not in the continuous image taking mode, the AF/AECPU 74 shifts to the step S125.

On the other hand, if the AF/AECPU 74 determines in the step S118 that the image taking mode is set to the continuous image taking mode or that 2R switch has not been turned on, it determines whether or not the focus could not be detected (step S119). Upon determining in the step S119 that the focus could not be detected, the AF/AECPU 74 shifts to a step S124.

On the other hand, upon determining in the step S119 that the focus was successfully detected, the AF/AECPU 74 transmits the defocus amount data calculated as a result of the AF calculation in the step S117, to the LCPU 50 (step S120). Subsequently, the AF/AECPU 74 shifts to a step S122.

The LCPU 50 calculates the number of pulses used to drive the lens, on the basis of the received defocus amount data. The LCPU 50 then drives the focusing lens 12 to the focused position on the basis of the number of drive pulses (step S121). At this time, the LCPU 50 calculates the lens position where the object is in focus, on the basis of the lens driving amount. The LCPU 50 then transmits the lens position to the AF/AECPU 74 as the drive target position data. The AF/AECPU 74 receives the drive target position data (step S122). Then, the AF/AECPU 74 stores the received drive target position data in the ring buffer shown in FIG. 7 (step S123). The AF/AECPU 74 subsequently shifts to a step S124.

After the above process, the AF/AECPU 74 determines whether or not the 2R switch has been turned on (step S124). If the AF/AECPU 74 determines that the 2R switch has not been turned on, it returns to the step S116. On the other hand, if the AF/AECPU 74 determines in the step S124 that the 2R switch has been turned on, it shifts to the process of the 2R sequence shown in FIG. 11 (step S125).

Further, if the AF/AECPU 74 determines in the step S115 that the first frame in the continuous image taking is not being imaged, it executes the AF calculation, described in FIG. 6 (step S126). Then, the AF/AECPU 74 determines whether or not the focus could not be detected (step S127). Upon determining in the step S127 that the focus could not be detected, the AF/AECPU 74 finishes the control shown in the flow chart.

On the other hand, upon determining in the step S127 that the focus was successfully detected, the AF/AECPU 74 transmits the defocus amount data calculated as a result of the AF calculation in the step S126, to the LCPU 50 (step S128). Subsequently, the AF/AECPU 74 shifts to a step S130.

The LCPU 50 calculates the number of pulses used to drive the lens, on the basis of the received defocus amount data. The LCPU 50 then drives the focusing lens 12 to the focused position on the basis of the number of drive pulses (step S129). At this time, the LCPU 50 calculates the lens position where the object is in focus, on the basis of the lens driving amount. The LCPU 50 then transmits the lens position to the AF/AECPU 74 as the drive target position. The AF/AECPU 74 receives the drive target position data (step S130). Then, the AF/AECPU 74 stores the received drive target position data in the ring buffer shown in FIG. 7 (step S131). The AF/AECPU 74 subsequently shifts to the process of the 2R sequence (step S132).

Figure 15:
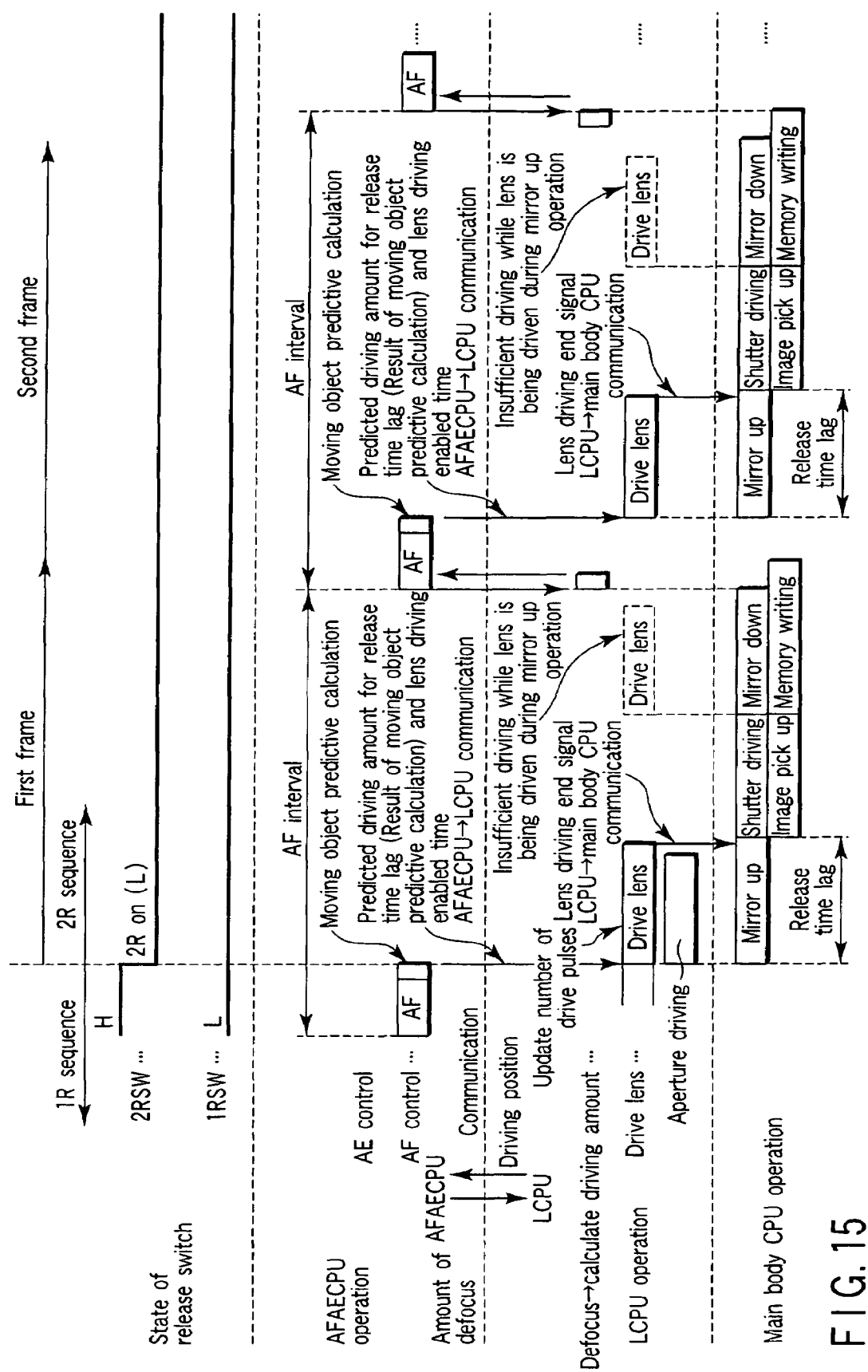
FIG. 15 is a timing chart showing the state observed before and after a second release switch is turned on in a continuous image taking mode.

FIG. 15 is a timing chart showing the state observed before and after the 2R switch 71 is turned on in the continuous image taking mode. The steps from the start of continuous image taking until the first frame are the same as those in the timing chart described in FIG. 10. Accordingly, their description is omitted.

During a lens driving operation performed in parallel with a mirror up operation, the lens may be insufficiently driven. This is because the time for which the lens is driven is limited so as not to allow the lens to be continuously driven after the mirror up operation has been completed. If the lens is thus insufficiently driven, it is driven so as to compensate for the insufficiency during a mirror down operation. Specifically, if during the current image taking, the lens fails to be driven sufficiently to achieve focusing, then it is driven so as to offset the insufficiency during a mirror down operation, thus preventing the insufficiency from affecting the next AF.

For the second and subsequent frames, the AF/AECPU 74 executes an AF calculation at the end of the sequence for the last frame. The AF/AECPU 74 then transmits defocus amount data to the LCPU 50. Upon receiving the defocus amount data, the LCPU 50 drives the lens on the basis of the amount of defocus. The LCPU 50 also calculates and transmits the drive target position to the AF/AECPU 74. The AF/AECPU 74 stores the drive target position in the ring buffer shown in FIG. 7.

The AF/AECPU 74 executes a moving object predictive calculation on the basis of the drive target position. At this time, as described in FIG. 13, the AF/AECPU 74 gives top priority to the result of the latest AF to select at least three results of AF. The AF/AECPU 74 then executes a moving object predictive calculation on the basis of the results. In this case, the result of the past AF is the result of image taking for the last frame. Subsequently, as described in FIG. 12, the AF/AECPU 74 predicts the lens position where the object, which moves after the release time lag, is in focus. The AF/AECPU 74 then transmits data on the predicted drive position to the LCPU 50. At the same time, the AF/AECPU 74 transmits data on the time for which the lens can be driven, to the LCPU 50. Subsequently, the same sequence as that for the first frame is executed.

The present invention has been described on the basis of the embodiment. However, the present invention is not limited to the above embodiment. For example, the technique for a moving object predictive calculation is not limited to the one described in the embodiment. Further, a light source used in the auxiliary light circuit is not limited to a LED. A lamp, a flash, or the like may be used. Moreover, the above embodiment is an example of a digital still camera. However, the present invention is applicable to a silver halide camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An auto focusing device for a camera comprising:
an image taking lens;
a focus detecting section which detects a focused state of the image taking lens;
an AF mode setting section which sets an AF mode of the camera to either a first AF mode in which upon detecting the focused state of the image taking lens, the focus detecting section is prohibited from subsequently performing a focus detecting operation, or a second AF mode in which even after detecting the focused state of the image taking lens, the focus detecting section continuously performs a focus detecting operation;
an auxiliary light emitting section which emits an auxiliary light to the object in association with the focus detecting operation by the focus detecting section, if the object has a low luminance; and
an emission control section which limits the number of times that the auxiliary light emitting section emits the auxiliary light to the object to one per a predetermined number of operations by the focus detecting section, if the AF mode setting section has set the AF mode to the second AF mode.

2. An auto focusing device for a camera comprising:
an image taking lens;
a focus detecting section which detects a focused state of the image taking lens;
an image taking mode setting section which sets an image taking mode of the camera to a continuous image taking mode in which images are continuously taken;
an auxiliary light emitting section which emits an auxiliary light to the object in association with the focus detecting operation by the focus detecting section if the object has a low luminance; and
an emission control section which limits the number of times that the auxiliary light emitting section emits the auxiliary light to the object to one per a predetermined number of operations by the focus detecting section, if the image taking mode setting section has set the image taking mode to the continuous image taking mode.

3. The auto focusing device according to claim 1, wherein the predetermined number is determined on the basis of a balance between an accuracy of focus detection by the focus detecting section and both consumption of batteries and glaringness caused by the operation of the auxiliary light emitting section.

4. The auto focusing device according to claim 2, wherein the predetermined number is determined on the basis of a balance between an accuracy of focus detection by the focus detecting section and both consumption of batteries and glaringness caused by the operation of the auxiliary light emitting section.

5. An auto focusing device for a camera comprising:
an image taking lens;
a focus detecting section which detects a focused state of the image taking lens;
an AF mode setting section which sets an AF mode of the camera to either a first AF mode in which upon detecting the focused state of the image taking lens, the focus detecting section is prohibited from subsequently performing a focus detecting operation, or a second AF mode in which even after detecting the focused state of the image taking lens, the focus detecting section continuously performs a focus detecting operation;

an auxiliary light emitting section which emits an auxiliary light to the object in association with the focus detecting operation by the focus detecting section, if the object has a low luminance;

an object change determining section which determines whether or not a state of the object has changed; and an emission control section which performs control so that the auxiliary light emitting section emits the auxiliary light to the object, if the AF mode setting section has set the AF mode to the second AF mode and if the object change determining section determines that the state of the object has changed.

6. An auto focusing device for a camera comprising:

an image taking lens;

a focus detecting section which detects a focused state of the image taking lens;

an image taking mode setting section which sets an image taking mode of the camera to a continuous image taking mode in which images are continuously taken;

an auxiliary light emitting section which emits an auxiliary light to the object in association with the focus detecting operation by the focus detecting section, if the object has a low luminance;

an object change determining section which determines whether or not a state of the object has changed; and an emission control section which performs control so that the auxiliary light emitting section emits the auxiliary light to the object, if the image taking mode setting section has set the image taking mode to the continuous image taking mode and if the object change determining section determines that the state of the object has changed.

7. The auto focusing device according to claim 5, wherein the object change determining section determines whether or not the state of the object has changed by determining whether or not the object has moved or an angle of the camera has been changed.

8. The auto focusing device according to claim 6, wherein the object change determining section determines whether or not the state of the object has changed by determining whether or not the object has moved or an angle of the camera has been changed.

9. An auto focusing device for a camera comprising:

an image taking lens;

a focus detecting section which detects a focused state of the image taking lens;

an AF mode setting section which sets an AF mode of the camera to either a first AF mode in which upon detecting the focused state of the image taking lens, the focus detecting section is prohibited from subsequently performing a focus detecting operation, or a second AF mode in which even after detecting the focused state of the image taking lens, the focus detecting section continuously performs a focus detecting operation;

an auxiliary light emitting section which emits an auxiliary light to the object in association with the focus detecting operation by the focus detecting section, if the object has a low luminance;

a first emission control section which limits the number of times that the auxiliary light emitting section emits the auxiliary light to the object to one per a predetermined number of operations by the focus detecting section, if the AF mode setting section has set the AF mode to the second AF mode;

an object change determining section which determines whether or not a state of the object changed during emission control by the first emission control section; and a second emission control section which performs control so that the auxiliary light emitting section emits the auxiliary light to the object, if the object change determining section determines that the state of the object has changed.

10. An auto focusing device for a camera comprising:

a focus detecting means for detecting a focused state of an image taking lens;

an AF mode setting means for setting an AF mode of the camera to either a first AF mode in which upon detecting the focused state of the image taking lens, the focus detecting means is prohibited from subsequently performing a focus detecting operation, or a second AF mode in which even after detecting the focused state of the image taking lens, the focus detecting means continuously performs a focus detecting operation;

an auxiliary light emitting means for emitting an auxiliary light to the object in association with the focus detecting operation by the focus detecting means, if the object has a low luminance; and an emission control means for limiting the number of times that the auxiliary light emitting means emits the auxiliary light to the object to one per a predetermined number of operations by the focus detecting means, if the AF mode setting means has set the image taking mode to the continuous image taking mode.

11. An auto focusing device for a camera comprising:

a focus detecting means for detecting a focused state of an image taking lens;

an image taking mode setting means for setting an image taking mode of the camera to a continuous image taking mode in which images are continuously taken;

an auxiliary light emitting means for emitting an auxiliary light to the object in association with the focus detecting operation by the focus detecting means, if the object has a low luminance; and an emission control means for limiting the number of times that the auxiliary light emitting means emits the auxiliary light to the object to one per a predetermined number of operations by the focus detecting means, if the image taking mode setting means has set the image taking mode to the continuous image taking mode.

12. The auto focusing device according to claim 10, wherein the predetermined number is determined on the basis of a balance between an accuracy of focus detection by the focus detecting means and both consumption of batteries and glaringness caused by the operation of the auxiliary light emitting means.

13. The auto focusing device according to claim 11, wherein the predetermined number is determined on the basis of a balance between an accuracy of focus detection by the focus detecting means and both consumption of batteries and glaringness caused by the operation of the auxiliary light emitting means.

14. An auto focusing device for a camera comprising:

a focus detecting means for detecting a focused state of an image taking lens;

an AF mode setting means for setting an AF mode of the camera to either a first AF mode in which upon detecting the focused state of the image taking lens, the focus detecting means is prohibited from subsequently performing a focus detecting operation, or a second AF mode in which even after detecting the focused state of the image taking lens, the focus detecting means continuously performs a focus detecting operation;

an auxiliary light emitting means for emitting an auxiliary light to the object in association with the focus detecting operation by the focus detecting means, if the object has a low luminance;

an object change determining means for determining whether or not a state of the object has changed; and an emission control means for performing control so that the auxiliary light emitting means emits the auxiliary light to the object, if the AF mode setting means has set the AF mode to the second AF mode and if the object change determining means determines that the state of the object has changed.

15. An auto focusing device for a camera comprising:

a focus detecting means for detecting a focused state of an image taking lens;

an image taking mode setting means for setting an image taking mode of the camera to a continuous image taking mode in which images are continuously taken;

an auxiliary light emitting means for emitting an auxiliary light to the object in association with the focus detecting operation by the focus detecting means, if the object has a low luminance;

an object change determining means for determining whether or not a state of the object has changed; and an emission control means for performing control so that the auxiliary light emitting means emits the auxiliary light to the object, if the image taking mode setting means has set the image taking mode to the continuous image taking mode and if the object change determining means determines that the state of the object has changed.

16. The auto focusing device according to claim 14, wherein the object change determining means determines whether or not the state of the object has changed by determining whether or not the object has moved or an angle of the camera has been changed.

17. The auto focusing device according to claim 14, wherein the object change determining means determines whether or not the state of the object has changed by determining whether or not the object has moved or an angle of the camera has been changed.

18. An auto focusing device for a camera comprising:

a focus detecting means for detecting a focused state of an image taking lens;

an AF mode setting means for setting an AF mode of the camera to either a first AF mode in which upon detecting the focused state of the image taking lens, the focus detecting means is prohibited from subsequently performing a focus detecting operation, or a second AF mode in which even after detecting the focused state of the image taking lens, the focus detecting means continuously performs a focus detecting operation;

an auxiliary light emitting means for emitting an auxiliary light to the object in association with the focus detecting operation by the focus detecting means, if the object has a low luminance;

a first emission control means for limiting the number of times that the auxiliary light emitting means emits the auxiliary light to the object to one per a predetermined number of operations by the focus detecting means, if the AF mode setting means has set the AF mode to the second AF mode;

an object change determining means for determining whether or not a state of the object changed during the emission control by the first emission control means; and a second emission control means for performing control so that the auxiliary light emitting means emits the auxiliary light to the object, if the object change determining means determines that the state of the object has changed.

19. A method used in an auto focusing device for a camera, for determining whether or not to emit an auxiliary light; the method comprising:

determining whether or not a focus was successfully detected during the last focus detecting operation;

determining whether or not an object had a low luminance during the last focus detecting operation;

determining whether or not an image taking mode of the camera is a continuous image taking mode in which images are continuously taken or a continuous AF mode in which even after a focused state of an image taking lens has been detected, the focus detecting operation is continuously performed; and setting a flag requesting an auxiliary light to be emitted to the object, on the basis of a result of determination of whether or not the object had a low luminance and a result of determination of the image taking mode of the camera.

20. The method used in an auto focusing device for a camera, for determining whether or not to emit an auxiliary light according to claim 19, wherein the image taking mode of the camera is determined when in the determination of whether or not the focus was successfully detected, the focus detection is determined to have failed and when in the determination of whether or not the object had a low luminance, the object is determined to have had a low luminance.

21. The method used in an auto focusing device for a camera, for determining whether or not to emit an auxiliary light according to claim 19, wherein the flag requesting an auxiliary light to be emitted to the object is set if the image taking mode of the camera is not determined to be the continuous image taking mode or the continuous AF mode.

22. The method used in an auto focusing device for a camera, for determining whether or not to emit an auxiliary light according to claim 19, further comprising counting the number of times that the focus detecting operation has been consecutively performed without emitting an auxiliary light, before setting the flag requesting an auxiliary light to be emitted to the object, if in the determination of the image taking mode of the camera, the image taking mode of the camera is the continuous image taking mode or the continuous AF mode.

23. The method used in an auto focusing device for a camera, for determining whether or not to emit an auxiliary light according to claim 22, wherein if the number of times is more than a predetermined number of times, the flag requesting an auxiliary light to be emitted to the object is set.

24. The method used in an auto focusing device for a camera, for determining whether or not to emit an auxiliary light according to claim 22, further comprising detecting whether or not a state of the object has changed, if the number of times is less than a predetermined number of times.

25. The method used in an auto focusing device for a camera, for determining whether or not to emit an auxiliary light according to claim 24, wherein the flag requesting an auxiliary light to be emitted to the object is set if in the detection of whether or not the state of the object has changed, it is detected that the state of the object has changed.

26. The method used in an auto focusing device for a camera, for determining whether or not to emit an auxiliary light according to claim 24, wherein whether or not the state of the object has changed is detected by detecting that the object has moved or that an angle of the camera has been changed.

* * * * *